(12) United States Patent
Mimassi et al.

(10) Patent No.: US 12,675,489 B1

(45) Date of Patent: *Jul. 7, 2026

(54) MULTI-SCALE TEMPORAL PROCESSING SYSTEM WITH CONTEXT INTEGRATION

(71) Applicant: RockSpoon, Inc., San Jose, CA (US)

(72) Inventors: Nagib Georges Mimassi, Palo Alto, CA (US); Brian Galvin, Silverdale, WA (US)

(73) Assignee: ROCKSPOON, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/177,614

(22) Filed: Apr. 13, 2025

(51) Int. Cl.
　　*G06F 16/2457*　　(2019.01)
　　*G06F 16/2458*　　(2019.01)

(52) U.S. Cl.
　　CPC .... *G06F 16/24575* (2019.01); *G06F 16/2477* (2019.01)

(58) Field of Classification Search
　　CPC ..................... G06F 16/24575; G06F 16/2477
　　See application file for complete search history.

(56) References Cited

U.S. PATENT DOCUMENTS

| | | | |
|---|---|---|---|
| 8,978,034 B1 * | 3/2015 | Goodson | ........... G06F 16/24544 |
| | | | 718/101 |
| 2007/0118498 A1 * | 5/2007 | Song | ....................... G06F 16/34 |
| | | | 707/E17.093 |

* cited by examiner

*Primary Examiner* — Charles Rones
*Assistant Examiner* — Xiaoqin Hu
(74) *Attorney, Agent, or Firm* — GALVIN PATENT LAW LLC; Brian R. Galvin; Erin L. Johnston

(57) ABSTRACT

A system for processing and integrating contextual information across multiple time scales simultaneously analyzes immediate and historical data. The system comprises three main components working together to maintain temporal coherence. A temporal processing engine processes input data at different time scales using multiple processors, each dedicated to a specific time horizon. A context integration engine extracts and organizes contextual features from the input data, generating representations for different types of context while maintaining state information across these context types. A fusion engine combines the outputs from the temporal processors and integrates them with the context representations to generate coherent, unified outputs. The three engines operate cooperatively to ensure temporal consistency while processing context across multiple time scales. This architecture enables robust handling of complex temporal and contextual relationships, supporting applications in fields such as customer service, healthcare monitoring, and interactive systems where maintaining coherence across time scales is crucial.

22 Claims, 13 Drawing Sheets

Multi-Scale Temporal Context Integration System Architecture
100

FIG. 1

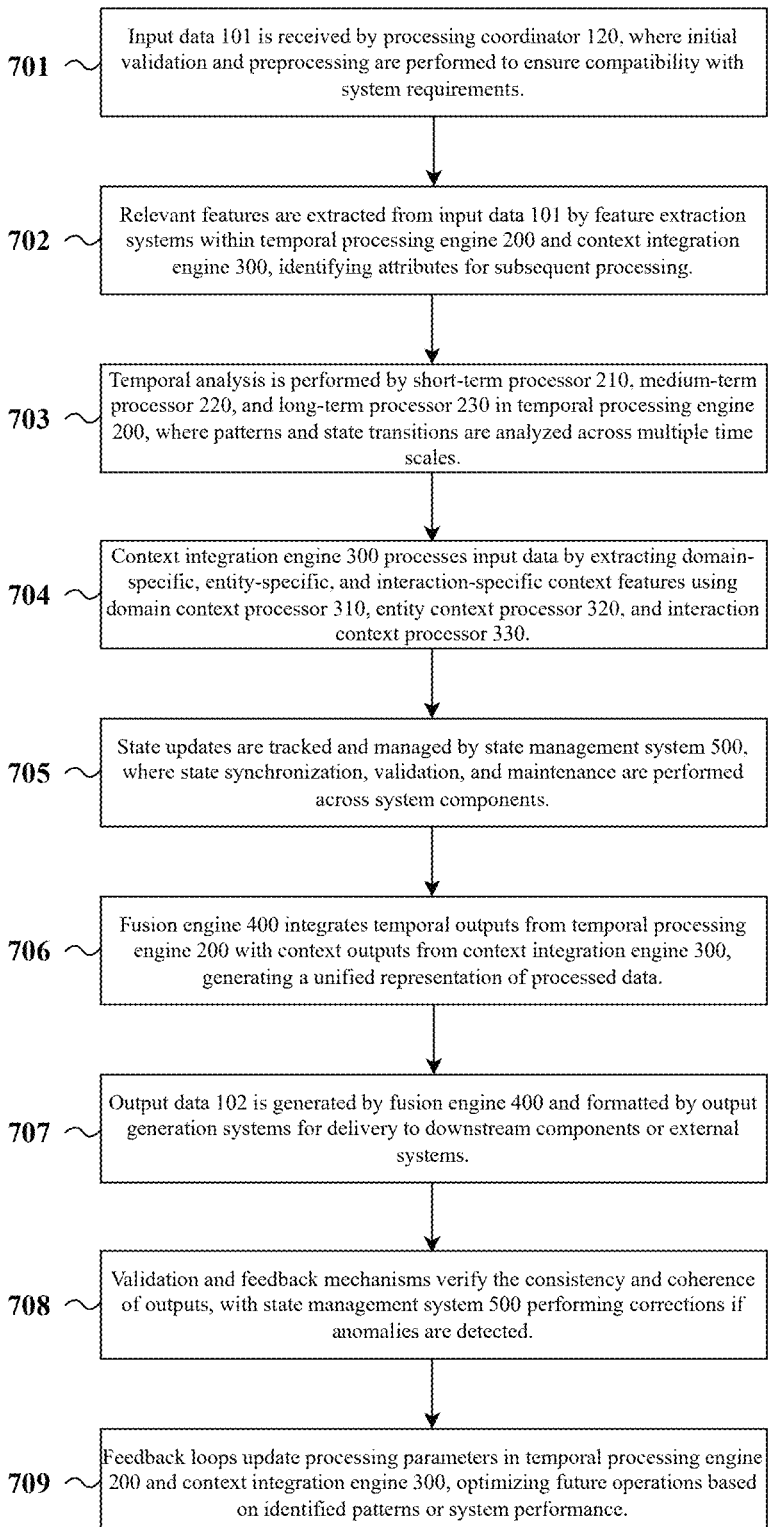

701 — Input data 101 is received by processing coordinator 120, where initial validation and preprocessing are performed to ensure compatibility with system requirements.

702 — Relevant features are extracted from input data 101 by feature extraction systems within temporal processing engine 200 and context integration engine 300, identifying attributes for subsequent processing.

703 — Temporal analysis is performed by short-term processor 210, medium-term processor 220, and long-term processor 230 in temporal processing engine 200, where patterns and state transitions are analyzed across multiple time scales.

704 — Context integration engine 300 processes input data by extracting domain-specific, entity-specific, and interaction-specific context features using domain context processor 310, entity context processor 320, and interaction context processor 330.

705 — State updates are tracked and managed by state management system 500, where state synchronization, validation, and maintenance are performed across system components.

706 — Fusion engine 400 integrates temporal outputs from temporal processing engine 200 with context outputs from context integration engine 300, generating a unified representation of processed data.

707 — Output data 102 is generated by fusion engine 400 and formatted by output generation systems for delivery to downstream components or external systems.

708 — Validation and feedback mechanisms verify the consistency and coherence of outputs, with state management system 500 performing corrections if anomalies are detected.

709 — Feedback loops update processing parameters in temporal processing engine 200 and context integration engine 300, optimizing future operations based on identified patterns or system performance.

FIG. 7

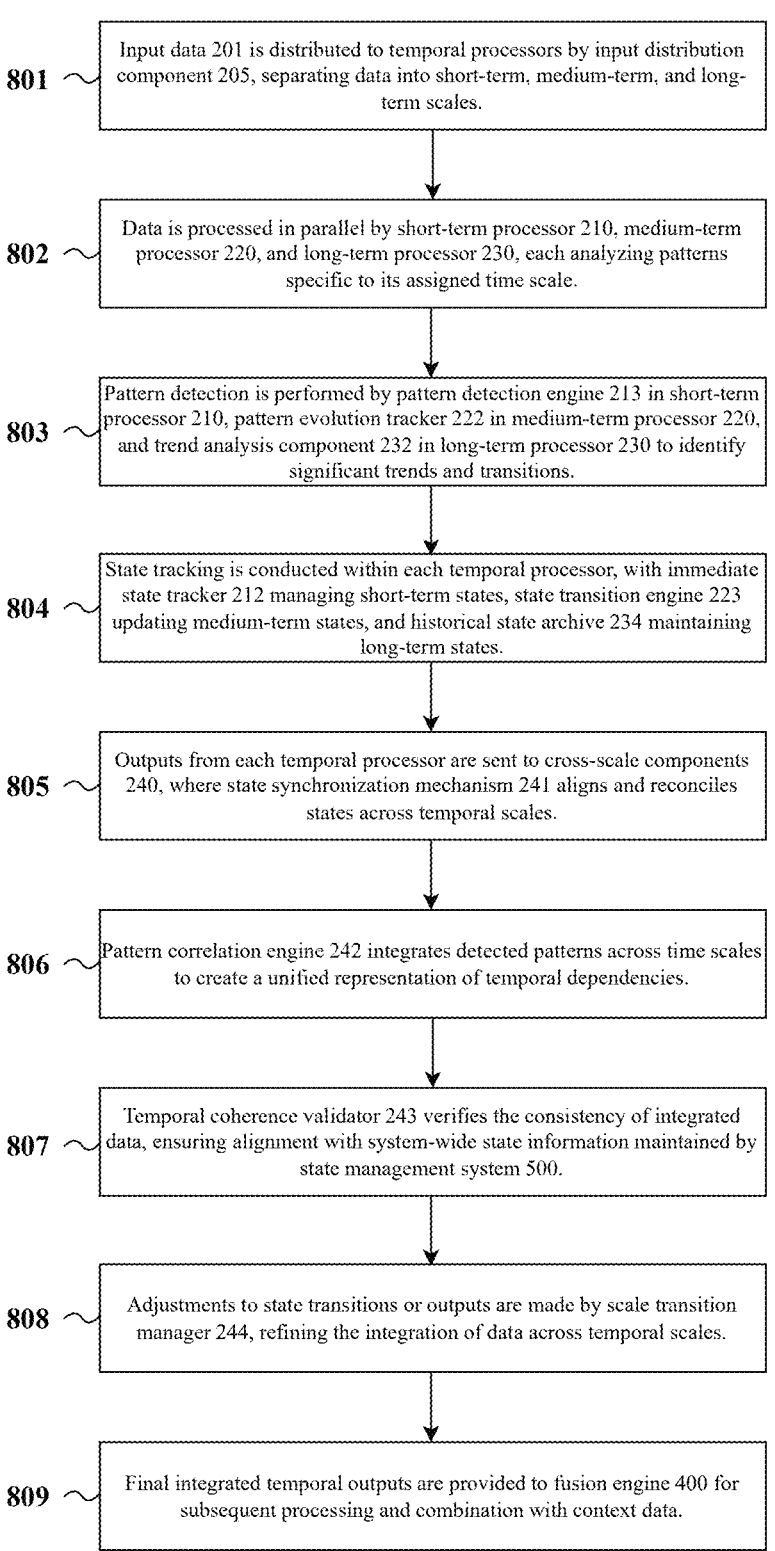

801  Input data 201 is distributed to temporal processors by input distribution component 205, separating data into short-term, medium-term, and long-term scales.

802  Data is processed in parallel by short-term processor 210, medium-term processor 220, and long-term processor 230, each analyzing patterns specific to its assigned time scale.

803  Pattern detection is performed by pattern detection engine 213 in short-term processor 210, pattern evolution tracker 222 in medium-term processor 220, and trend analysis component 232 in long-term processor 230 to identify significant trends and transitions.

804  State tracking is conducted within each temporal processor, with immediate state tracker 212 managing short-term states, state transition engine 223 updating medium-term states, and historical state archive 234 maintaining long-term states.

805  Outputs from each temporal processor are sent to cross-scale components 240, where state synchronization mechanism 241 aligns and reconciles states across temporal scales.

806  Pattern correlation engine 242 integrates detected patterns across time scales to create a unified representation of temporal dependencies.

807  Temporal coherence validator 243 verifies the consistency of integrated data, ensuring alignment with system-wide state information maintained by state management system 500.

808  Adjustments to state transitions or outputs are made by scale transition manager 244, refining the integration of data across temporal scales.

809  Final integrated temporal outputs are provided to fusion engine 400 for subsequent processing and combination with context data.

FIG. 8

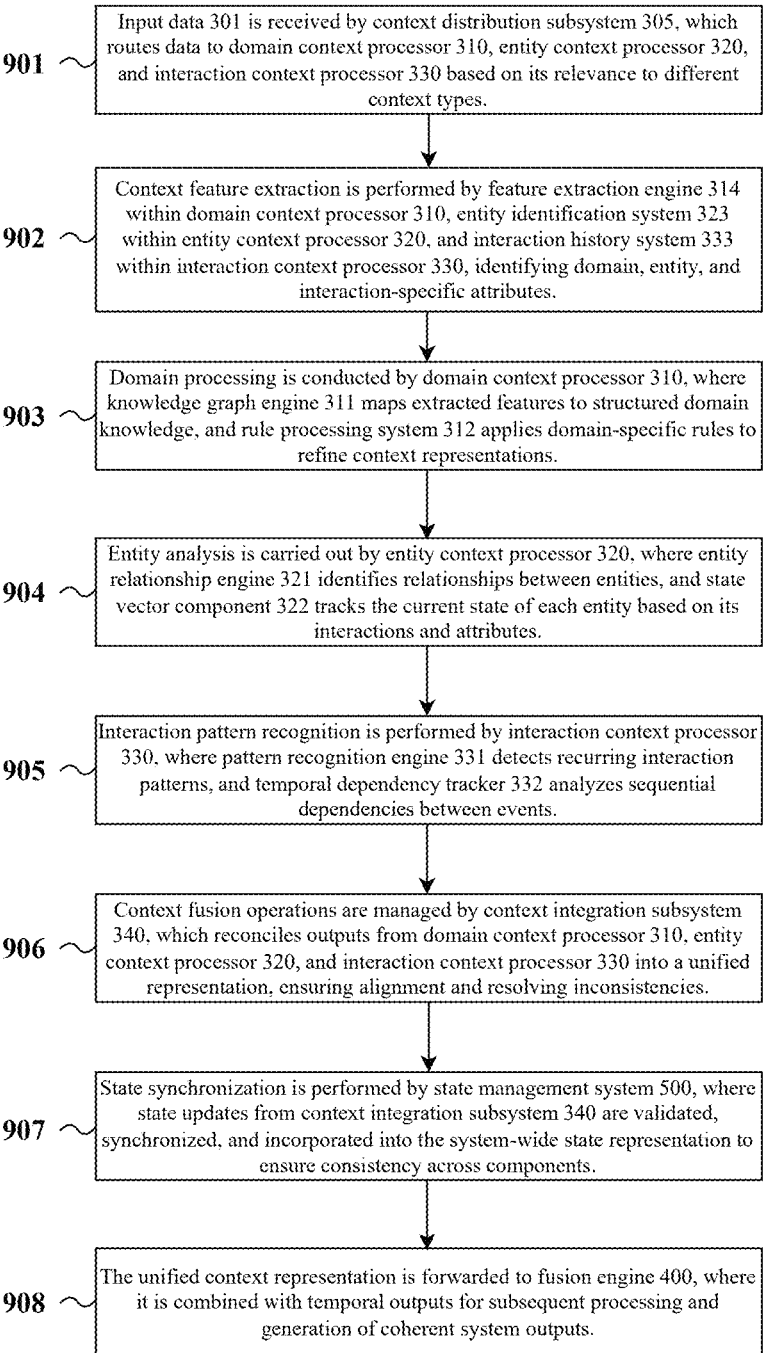

901 — Input data 301 is received by context distribution subsystem 305, which routes data to domain context processor 310, entity context processor 320, and interaction context processor 330 based on its relevance to different context types.

902 — Context feature extraction is performed by feature extraction engine 314 within domain context processor 310, entity identification system 323 within entity context processor 320, and interaction history system 333 within interaction context processor 330, identifying domain, entity, and interaction-specific attributes.

903 — Domain processing is conducted by domain context processor 310, where knowledge graph engine 311 maps extracted features to structured domain knowledge, and rule processing system 312 applies domain-specific rules to refine context representations.

904 — Entity analysis is carried out by entity context processor 320, where entity relationship engine 321 identifies relationships between entities, and state vector component 322 tracks the current state of each entity based on its interactions and attributes.

905 — Interaction pattern recognition is performed by interaction context processor 330, where pattern recognition engine 331 detects recurring interaction patterns, and temporal dependency tracker 332 analyzes sequential dependencies between events.

906 — Context fusion operations are managed by context integration subsystem 340, which reconciles outputs from domain context processor 310, entity context processor 320, and interaction context processor 330 into a unified representation, ensuring alignment and resolving inconsistencies.

907 — State synchronization is performed by state management system 500, where state updates from context integration subsystem 340 are validated, synchronized, and incorporated into the system-wide state representation to ensure consistency across components.

908 — The unified context representation is forwarded to fusion engine 400, where it is combined with temporal outputs for subsequent processing and generation of coherent system outputs.

FIG. 9

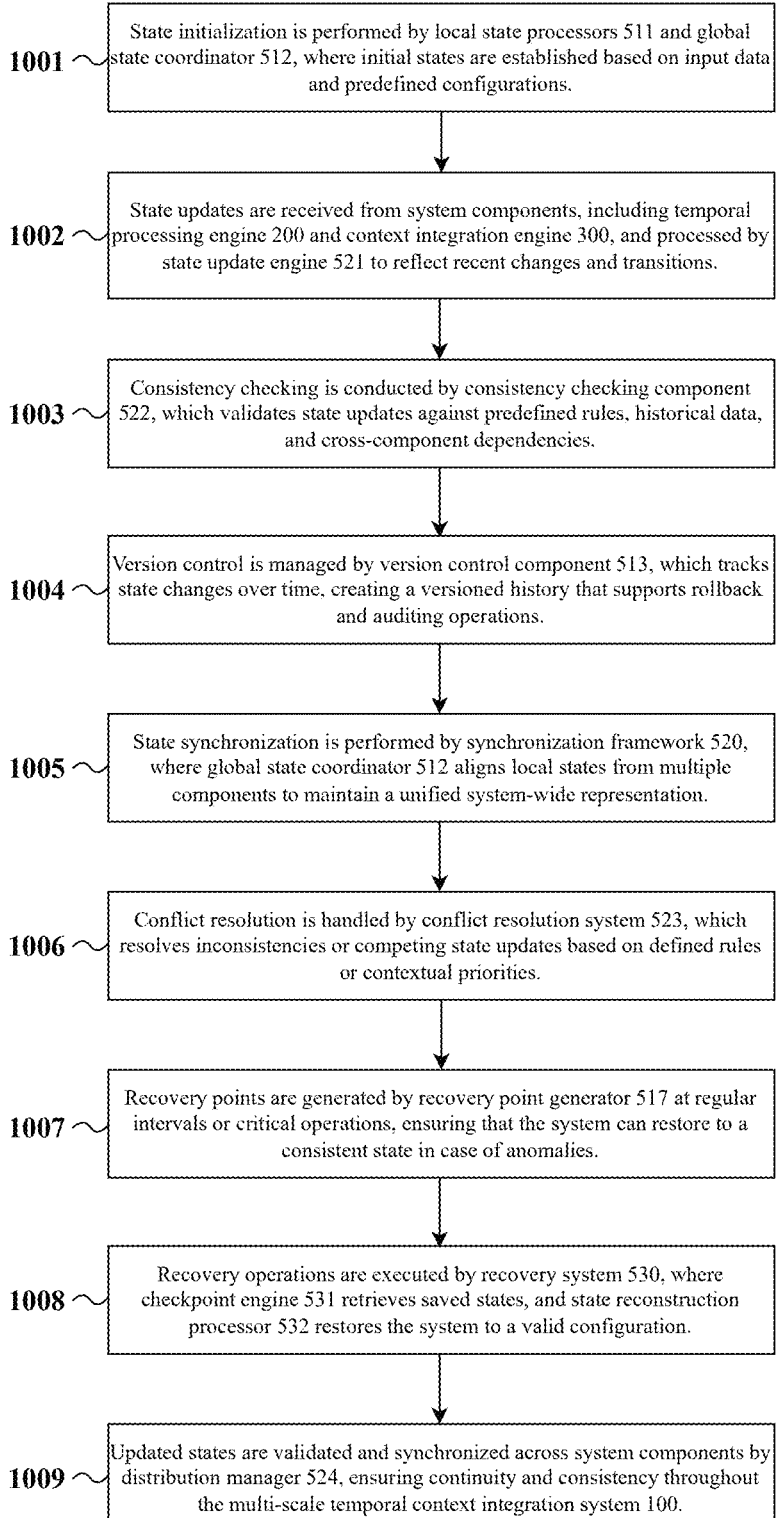

1001 — State initialization is performed by local state processors 511 and global state coordinator 512, where initial states are established based on input data and predefined configurations.

1002 — State updates are received from system components, including temporal processing engine 200 and context integration engine 300, and processed by state update engine 521 to reflect recent changes and transitions.

1003 — Consistency checking is conducted by consistency checking component 522, which validates state updates against predefined rules, historical data, and cross-component dependencies.

1004 — Version control is managed by version control component 513, which tracks state changes over time, creating a versioned history that supports rollback and auditing operations.

1005 — State synchronization is performed by synchronization framework 520, where global state coordinator 512 aligns local states from multiple components to maintain a unified system-wide representation.

1006 — Conflict resolution is handled by conflict resolution system 523, which resolves inconsistencies or competing state updates based on defined rules or contextual priorities.

1007 — Recovery points are generated by recovery point generator 517 at regular intervals or critical operations, ensuring that the system can restore to a consistent state in case of anomalies.

1008 — Recovery operations are executed by recovery system 530, where checkpoint engine 531 retrieves saved states, and state reconstruction processor 532 restores the system to a valid configuration.

1009 — Updated states are validated and synchronized across system components by distribution manager 524, ensuring continuity and consistency throughout the multi-scale temporal context integration system 100.

FIG. 10

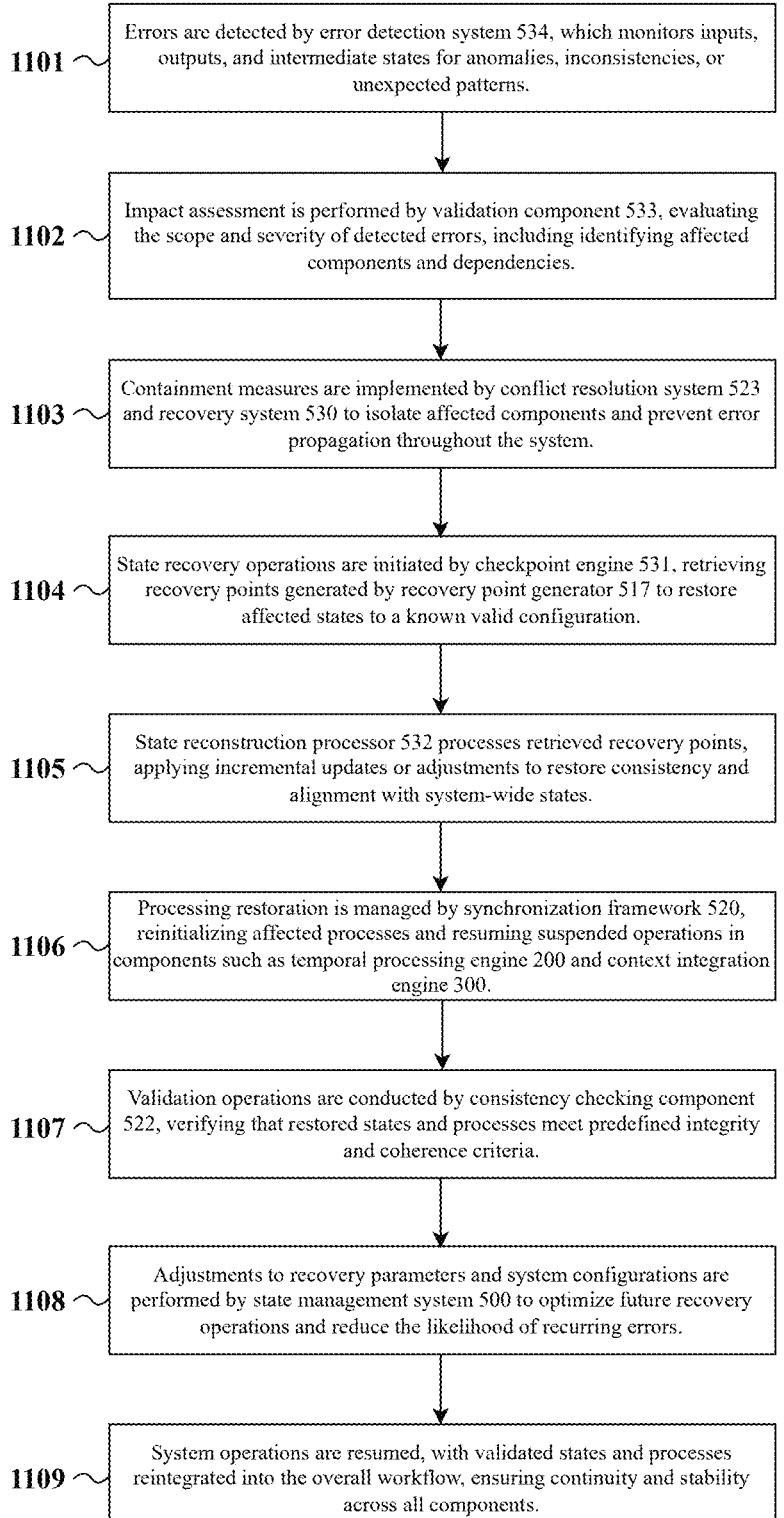

1101 — Errors are detected by error detection system 534, which monitors inputs, outputs, and intermediate states for anomalies, inconsistencies, or unexpected patterns.

1102 — Impact assessment is performed by validation component 533, evaluating the scope and severity of detected errors, including identifying affected components and dependencies.

1103 — Containment measures are implemented by conflict resolution system 523 and recovery system 530 to isolate affected components and prevent error propagation throughout the system.

1104 — State recovery operations are initiated by checkpoint engine 531, retrieving recovery points generated by recovery point generator 517 to restore affected states to a known valid configuration.

1105 — State reconstruction processor 532 processes retrieved recovery points, applying incremental updates or adjustments to restore consistency and alignment with system-wide states.

1106 — Processing restoration is managed by synchronization framework 520, reinitializing affected processes and resuming suspended operations in components such as temporal processing engine 200 and context integration engine 300.

1107 — Validation operations are conducted by consistency checking component 522, verifying that restored states and processes meet predefined integrity and coherence criteria.

1108 — Adjustments to recovery parameters and system configurations are performed by state management system 500 to optimize future recovery operations and reduce the likelihood of recurring errors.

1109 — System operations are resumed, with validated states and processes reintegrated into the overall workflow, ensuring continuity and stability across all components.

FIG. 11

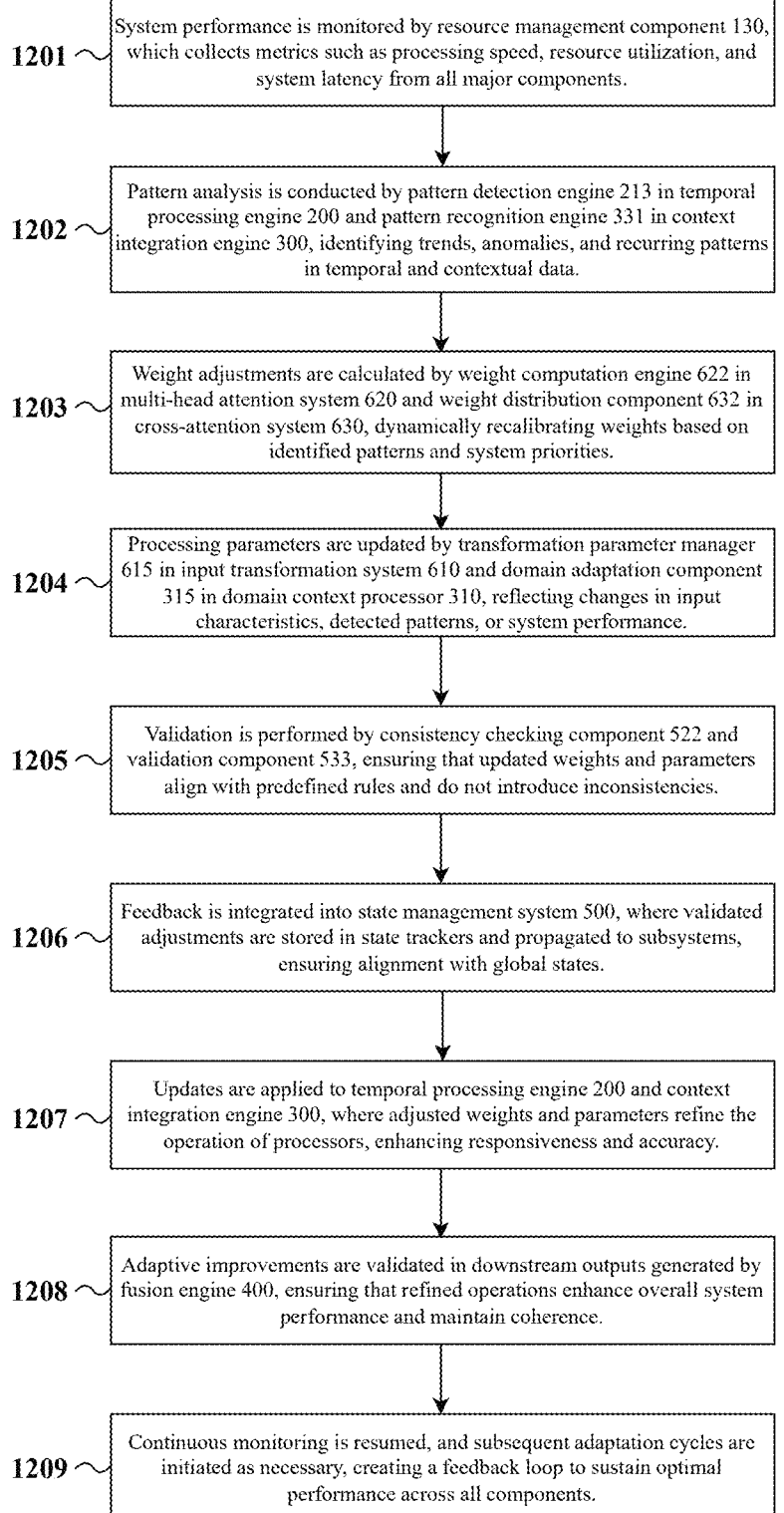

1201 — System performance is monitored by resource management component 130, which collects metrics such as processing speed, resource utilization, and system latency from all major components.

1202 — Pattern analysis is conducted by pattern detection engine 213 in temporal processing engine 200 and pattern recognition engine 331 in context integration engine 300, identifying trends, anomalies, and recurring patterns in temporal and contextual data.

1203 — Weight adjustments are calculated by weight computation engine 622 in multi-head attention system 620 and weight distribution component 632 in cross-attention system 630, dynamically recalibrating weights based on identified patterns and system priorities.

1204 — Processing parameters are updated by transformation parameter manager 615 in input transformation system 610 and domain adaptation component 315 in domain context processor 310, reflecting changes in input characteristics, detected patterns, or system performance.

1205 — Validation is performed by consistency checking component 522 and validation component 533, ensuring that updated weights and parameters align with predefined rules and do not introduce inconsistencies.

1206 — Feedback is integrated into state management system 500, where validated adjustments are stored in state trackers and propagated to subsystems, ensuring alignment with global states.

1207 — Updates are applied to temporal processing engine 200 and context integration engine 300, where adjusted weights and parameters refine the operation of processors, enhancing responsiveness and accuracy.

1208 — Adaptive improvements are validated in downstream outputs generated by fusion engine 400, ensuring that refined operations enhance overall system performance and maintain coherence.

1209 — Continuous monitoring is resumed, and subsequent adaptation cycles are initiated as necessary, creating a feedback loop to sustain optimal performance across all components.

FIG. 12

MULTI-SCALE TEMPORAL PROCESSING SYSTEM WITH CONTEXT INTEGRATION

CROSS-REFERENCE TO RELATED APPLICATIONS

Priority is claimed in the application data sheet to the following patents or patent applications, each of which is expressly incorporated herein by reference in its entirety: None.

BACKGROUND OF THE INVENTION

Field of the Art

The present invention relates to the field of artificial intelligence systems and temporal processing architectures, and more specifically to systems and methods for processing and integrating multiple time scales of context in interactive artificial intelligence applications, including context-aware computing, temporal processing frameworks, and state management systems.

Discussion of the State of the Art

Current artificial intelligence systems face significant limitations in their ability to process and integrate contextual information across multiple time scales effectively. Existing approaches typically operate at a single, fixed temporal scale, which restricts their ability to handle the diverse and dynamic nature of real-world interactions. This single-scale processing hinders their capability to maintain coherence across different temporal horizons, such as immediate, recent, and long-term contexts, resulting in suboptimal system performance.

One of the key challenges lies in the integration of temporal data with domain-specific context. Many current systems fail to reconcile domain-specific features, entity relationships, and interaction patterns with temporal information in a coherent manner. This limitation reduces the effectiveness of applications requiring rich, context-sensitive insights, such as customer service, healthcare monitoring, and interactive entertainment systems.

Another significant drawback of current systems is their poor handling of long-term dependencies and state transitions. Without a robust mechanism for tracking and maintaining state information across temporal horizons, these systems struggle to preserve continuity in their responses and fail to adapt effectively to evolving patterns over time. This lack of temporal coherence is particularly problematic in applications requiring sustained and adaptive interaction with users or processes.

Moreover, existing solutions often inadequately integrate immediate and historical context. While some systems may excel at processing real-time data, they lack the ability to incorporate insights from historical trends or evolving user preferences. Conversely, systems focused on long-term analysis frequently fail to respond effectively to immediate changes or short-term events.

What is needed is a system that processes and integrates multiple time scales of context while maintaining temporal coherence, flexibly incorporating domain-specific information, entity relationships, and interaction patterns, with robust state management to ensure consistent and adaptive responses.

SUMMARY OF THE INVENTION

Accordingly, the inventor has conceived and reduced to practice a system and method for multi-scale temporal context processing and integration in interactive AI systems. The system comprises a temporal processing engine, a context integration engine, and a fusion engine that operate cooperatively to process input data across multiple time scales, extract and manage context features, and generate coherent outputs while maintaining temporal coherence. The invention provides a robust framework for simultaneously processing immediate, recent, and historical data, integrating domain-specific and contextual information, and ensuring consistent state management across time horizons.

According to a preferred embodiment, the system includes a temporal processing engine configured to receive input data comprising immediate and historical context, process the data using multiple temporal processors operating at distinct time scales, and maintain temporal coherence between the temporal processors.

According to another preferred embodiment, the temporal processing engine includes a short-term processor for processing immediate context, a medium-term processor for processing recent historical data, and a long-term processor for processing extended historical data. Each processor identifies patterns and tracks state transitions specific to its time scale while maintaining corresponding state information.

According to an aspect of an embodiment, the system further includes a context integration engine configured to extract context features, generate context representations for different context types, and maintain relationships and state changes across domain-specific, entity-specific, and interaction-specific contexts.

According to another aspect of an embodiment, the fusion engine combines outputs from the plurality of temporal processors, integrates these outputs with the context representations, and dynamically assigns weights to different temporal scales based on identified patterns to generate a coherent output.

According to an aspect of an embodiment, maintaining temporal coherence involves identifying and reconciling temporal dependencies and tracking state transitions across time scales to ensure consistent outputs.

According to another aspect of an embodiment, the system includes a state management system configured to maintain consistent state information and track state transitions across multiple time scales during temporal processing.

According to another aspect of an embodiment, the system further includes a pattern recognition system that identifies and tracks pattern evolution across multiple time scales and integrates this information into the context representations.

According to an aspect of an embodiment, the fusion engine implements sequential fusion layers to integrate temporal information, context types, and cross-context relationships into a unified representation.

According to another aspect of an embodiment, the system includes an adaptation system configured to adjust processing parameters and update context representations based on identified pattern changes across time scales.

According to an aspect of an embodiment, the fusion engine validates the consistency of temporal, context, and state information throughout the integration process, ensuring coherence in the final output.

BRIEF DESCRIPTION OF THE DRAWING FIGURES

FIG. 1 is a block diagram illustrating exemplary architecture of multi-scale temporal context integration system

FIG. 7 is a method diagram illustrating the overall processing of multi-scale temporal context integration system.

FIG. 8 is a method diagram illustrating the temporal processing of multi-scale temporal context integration system.

FIG. 9 is a method diagram illustrating the context integration of multi-scale temporal context integration system.

FIG. 10 is a method diagram illustrating the state management of multi-scale temporal context integration system.

FIG. 11 is a method diagram illustrating the error recovery of multi-scale temporal context integration system.

FIG. 12 is a method diagram illustrating the adaptation of multi-scale temporal context integration system.

DETAILED DESCRIPTION OF THE INVENTION

Figure 2:
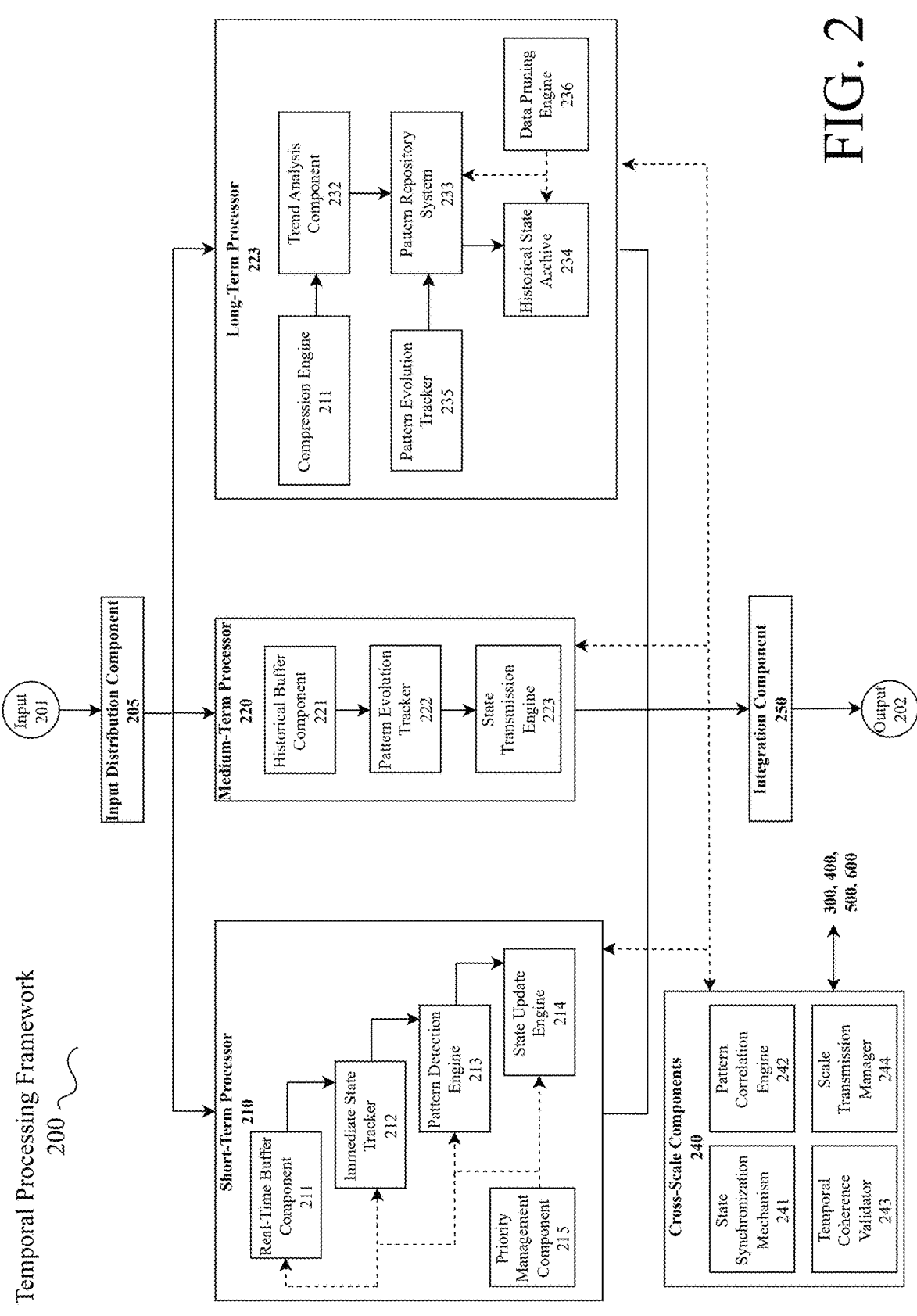
FIG. 2 is a block diagram illustrating exemplary architecture of temporal processing framework.

The inventor has conceived and reduced to practice a system that processes and integrates temporal context across multiple time scales within an interactive artificial intelligence framework. The system comprises a temporal processing framework, a context integration framework, a fusion mechanism, and a state management system. These components operate in conjunction to process immediate, short-term, medium-term, and long-term context information, facilitating coherence across temporal scales.

The temporal processing framework includes multiple temporal processors, each configured to analyze input data at a specific time scale. The context integration framework processes context-specific information, including domain-specific, entity-specific, and interaction-specific contexts. The fusion mechanism combines outputs from the temporal processors and context integration framework, generating a unified output. The state management system tracks and synchronizes state information across components to ensure temporal coherence and consistency.

The temporal processing framework processes input data across multiple time scales, such as immediate context, short-term historical data, medium-term patterns, and long-term trends. Each temporal processor within the framework is configured to handle a specific time scale. In an embodiment, the temporal processors include a short-term processor configured to analyze real-time data and track immediate state transitions, a medium-term processor configured to integrate data from recent interactions, identify evolving patterns, and maintain temporal coherence within a specified window, and a long-term processor configured to analyze historical trends and maintain persistent states over extended time horizons. The temporal processors may, for example, use pattern recognition algorithms to detect recurring events and establish correlations across time scales. Each processor is operable to maintain state information specific to its assigned time scale, enabling localized processing without cross-interference.

The context integration framework extracts and integrates context features from domain-specific, entity-specific, and interaction-specific information. This framework is responsible for generating representations for different context types, ensuring consistency across these representations, and maintaining relationships between context elements. In an embodiment, the context integration framework includes components such as a domain context processor configured to analyze domain-specific data, such as industry standards or predefined rules, an entity context processor configured to map relationships between entities and track their states, and an interaction context processor configured to analyze patterns of interaction between entities and maintain their temporal evolution. The context integration framework may implement attention mechanisms, such as query, key, and value transformations, to prioritize context elements based on their relevance to the current input data. The framework also ensures synchronization of context representations with the state management system.

The fusion mechanism combines outputs from the temporal processors and the context integration framework, generating a coherent and unified representation of the processed data. The fusion mechanism dynamically assigns weights to temporal scales and context types, facilitating an adaptive integration process. In an embodiment, the fusion mechanism comprises a temporal fusion component configured to reconcile outputs from the short-term, medium-term, and long-term processors, a context fusion component configured to combine domain, entity, and interaction contexts, and a cross-scale integration component configured to integrate temporal and context outputs into a single representation. The fusion mechanism may, for example, employ sequential fusion layers to ensure that information is processed hierarchically, with lower-level features feeding into higher-level representations. The mechanism validates the consistency of the fused output with the state management system.

The state management system maintains consistent state information across the components of the system. It tracks state transitions, resolves conflicts between states, and ensures persistence across multiple time scales. In an embodiment, the state management system includes a state tracker configured to monitor and update states based on inputs from the temporal processors and context integration framework, a state synchronization component configured to align state information across components, ensuring coherence, and a recovery component configured to restore states in the event of errors or inconsistencies. The state management system may, for example, implement checkpointing mechanisms to periodically save states and facilitate recovery. It may also use consistency checks to detect and resolve discrepancies between component states.

The system may employ multi-head attention to capture multiple aspects of context simultaneously. In this embodiment, the input data and context features are divided into subsets, and independent attention computations are performed in parallel. The results from these computations are then concatenated and transformed into a unified output representation. This architecture allows the system to process diverse contextual relationships concurrently, enhancing its adaptability and robustness.

In certain embodiments, cross-attention mechanisms are utilized to integrate temporal and contextual data streams. For instance, queries derived from temporal processors may be aligned with keys and values originating from the context integration framework. This alignment facilitates the dynamic fusion of temporal and context-specific information, ensuring coherence across domains. The cross-attention mechanism dynamically adjusts the weights assigned to temporal and contextual elements based on their relevance, optimizing the integration process.

The attention mechanism is further integrated into the fusion component to reconcile outputs from different temporal processors and context integration components. In one example, attention weights are computed to prioritize recent interactions when generating real-time responses while maintaining consistency with historical patterns. This adaptive approach ensures that the system balances immediate responsiveness with long-term contextual understanding. By leveraging attention mechanisms, the system achieves a high degree of precision and relevance in its output generation, supporting complex and dynamic interactive applications.

According to another aspect of the embodiment, the system implements a multi-head attention architecture for processing temporal and contextual information. The attention mechanism may comprise three primary transformation components: query transformation, key transformation, and value transformation. In one embodiment, these transformations are implemented as learned linear projections that map input features into respective representation spaces.

The query transformation component may process input data to generate query vectors that represent information requests. For example, when processing temporal data, the query transformation may extract features representing the current time step's information needs. The key transformation component may generate key vectors that encode reference information from historical data and context representations. The value transformation component may produce value vectors containing the actual information content to be extracted.

According to an aspect of the embodiment, the attention computation may be implemented using scaled dot-product attention. The system may compute attention weights by performing matrix multiplication between query and key vectors, followed by scaling to prevent gradient instability. In one embodiment, the scaling factor may be determined based on the dimension of the key vectors. The resulting attention weights may then undergo softmax normalization to produce probability distributions over the values.

The multi-head architecture may partition the input representation space into multiple subspaces, wherein each subspace is processed by an independent attention mechanism. In one embodiment, the number of attention heads may be determined based on input dimensionality and computational resources. The system may implement parallel processing of attention heads to improve computational efficiency. The outputs from multiple attention heads may be concatenated and transformed through a linear projection to produce the final attention output.

According to another aspect of the embodiment, the system may implement cross-attention mechanisms for integrating temporal and contextual information streams. The cross-attention component may generate queries from one information stream and keys/values from another. For example, temporal queries may be matched against contextual keys to identify relevant context information. The cross-attention weights may be computed using the same scaled dot-product mechanism, but with additional normalization to account for differences in feature distributions between streams.

The attention mechanism may further implement position-aware processing through the incorporation of positional encodings. In one embodiment, these encodings may be implemented as sinusoidal functions of different frequencies, allowing the system to maintain awareness of temporal ordering. The positional encodings may be added to input features before attention computation or incorporated into the key/query transformations.

According to an aspect of the embodiment, the attention mechanism may include adaptive sparsity control. The system may implement dropout on attention weights to prevent overfitting and improve generalization. Additionally, the attention mechanism may employ masking techniques to restrict attention to valid temporal ranges or context types. The masking may be implemented through multiplicative masks applied to attention weights before softmax normalization.

The integration of attention mechanisms with the state management system may be achieved through attention-aware state updates. The attention weights may be used to modulate the importance of different state components during state transitions. In one embodiment, the system maintains a history of attention patterns to inform future state updates and detect significant changes in attention distribution.

The attention mechanism may implement gradient-based optimization for learning transformation parameters. The system may employ layer normalization before and after attention computation to stabilize training. Additionally, the attention mechanism may include residual connections around each attention block to facilitate gradient flow during training.

According to a preferred embodiment, the processing architecture comprises specialized components for input processing, core processing, and integration, configured to operate cooperatively while maintaining temporal coherence and context consistency.

The input processing architecture may implement a multi-stage pipeline for data preparation and validation. In one embodiment, input data undergoes normalization through a series of preprocessing steps. For example, numerical values may be scaled to a standardized range, typically $[-1, 1]$, using min-max normalization or z-score standardization. Additionally, categorical data may be encoded using techniques such as one-hot encoding or learned embeddings. Further, temporal data may be aligned to consistent timestamps and resampled to uniform intervals appropriate for each temporal scale. The preprocessed data may then be validated against predefined schemas that specify required fields, data types, and value ranges.

The core processing units may comprise parallel processors operating at different temporal scales. In one embodiment, the short-term processor maintains a sliding window buffer, typically spanning the most recent 24 hours, which may be implemented as a circular buffer to efficiently manage memory usage. The medium-term processor may operate on data aggregated into time buckets, with bucket size increasing logarithmically with age to balance resolution and resource usage. The long-term processor may employ a hierarchical storage structure wherein historical data is progressively compressed using techniques such as wavelet transformation while preserving significant patterns.

According to an aspect of the embodiment, the context-specific processors implement specialized embedding systems for different context types. Domain context may be embedded using knowledge graph representations, wherein nodes represent domain concepts and edges represent relationships. Entity context may use a combination of static features stored in structured records and dynamic features maintained in state vectors. Interaction context may be modeled using attention-based architectures that capture temporal dependencies between entities.

The integration framework may implement a multi-layer fusion architecture. In one embodiment, a first layer performs temporal fusion through weighted combination of outputs from different temporal scales, with weights dynamically adjusted based on pattern relevance. A second layer may integrate context representations using cross-attention mechanisms that align temporal and contextual features. A final layer may perform consistency validation through constraint checking and state verification.

State management may be implemented through a distributed state tracking system. Each processor may maintain local state information in a versioned data structure that records both current values and historical transitions. State synchronization may be achieved through a two-phase commit protocol that ensures consistency across components. Recovery points may be created periodically using a copy-on-write mechanism that minimizes impact on ongoing processing.

The data structures employed by the system may include temporal state matrices in n-dimensional real space where n represents sequence length and d represents feature dimension. The system may also utilize context embedding tensors in m-dimensional space where m represents the number of context types. Additionally, attention weight matrices and state transition graphs may be employed for cross-context integration and state management respectively.

Core algorithms implemented by the system may include temporal pattern detection using sliding window correlation analysis, context feature extraction using hierarchical attention networks, state transition validation using graph traversal algorithms, and fusion computation using weighted tensor operations.

The system may implement error handling through a hierarchical recovery mechanism. In one embodiment, local errors within processors are handled through state rollback and recomputation. Cross-component inconsistencies may trigger a coordinated recovery process that restores the system to the last known consistent state. Performance optimization may be achieved through adaptive resource allocation, wherein processing resources are dynamically assigned based on workload characteristics and pattern complexity.

According to another aspect of the embodiment, the system implements specific workflows for processing input data through multiple stages while maintaining temporal coherence and context consistency. In one example workflow, the system may process a customer interaction in a service environment. The input data may comprise the current customer query, recent interaction history, and long-term customer relationship data.

In this example workflow, the input processing stage may first normalize the textual query data using natural language processing techniques and align temporal metadata with standardized timestamps. The temporal processing framework may then simultaneously activate multiple temporal processors. The short-term processor may analyze the immediate query context and current session state. The medium-term processor may examine recent interactions from the past 24 hours to identify relevant patterns, while the long-term processor may analyze historical interaction patterns spanning multiple months.

Concurrent with temporal processing, the context integration framework may extract domain-specific features related to the service environment, entity relationships connecting the customer with previous interactions and service agents, and interaction patterns characteristic of the customer's communication style. The fusion mechanism may then combine these temporal and contextual outputs, weighing recent interaction patterns more heavily for immediate response generation while incorporating long-term preferences for overall response strategy.

According to another aspect of the embodiment, the system implements specific error handling workflows. For example, when encountering a state inconsistency between temporal processors, the system may initiate a hierarchical recovery procedure. The procedure may first isolate the affected processor, maintain system operation using remaining processors, and initiate state reconstruction from the last known consistent checkpoint. The system may continue processing inputs with degraded temporal resolution until state consistency is restored.

The system may implement resource management workflows for handling varying computational loads. In one embodiment, during periods of high input volume, the system may dynamically adjust processing allocation across temporal scales. For example, the system may increase resources allocated to short-term processing while reducing long-term pattern analysis frequency. The system may implement load balancing through dynamic adjustment of processing window sizes and pattern recognition thresholds.

According to another aspect of the embodiment, the system may implement workflows for handling concurrent processing streams. For example, in a multi-user environment, the system may maintain separate temporal and context processing streams for each user while sharing computational resources across streams. The system may implement priority-based resource allocation, wherein critical interaction streams receive preferential processing allocation while maintaining minimum service levels for all streams.

The system may further implement workflows for gradual feature deployment and testing. In one embodiment, new processing features or context types may be initially deployed in parallel with existing processors, allowing comparison and validation of outputs before full integration. The system may implement gradual rollout procedures wherein new features are activated for increasing portions of the input stream while monitoring system stability and output consistency.

The system operates by receiving input data, processing the data across temporal processors, integrating relevant context features, and generating a coherent output. The workflow involves preprocessing input data to extract relevant features and validate data formats, processing the data at multiple time scales within the temporal processing framework to generate outputs for immediate, short-term, medium-term, and long-term analysis, extracting and integrating domain, entity, and interaction contexts within the context integration framework to create unified context representations, combining the outputs from the temporal processors and context integration framework within the fusion mechanism to generate a final output, and updating state information based on the final output and synchronizing states across components within the state management system. This workflow ensures that the system maintains temporal coherence and context consistency, enabling robust and adaptive responses to input data. Specific implementations may vary depending on the application domain, processing requirements, and available resources.

According to another aspect of the embodiment, the system implements mechanisms for continuous adaptation and learning across temporal scales. The adaptation system may modify processing parameters and update context representations based on observed patterns and system performance metrics.

In one embodiment, the temporal processors may implement adaptive window sizing based on pattern detection rates. For example, the medium-term processor may adjust its processing window size based on the frequency and significance of detected patterns. When significant patterns are detected more frequently, the system may reduce the window size to increase temporal resolution. Conversely, during periods of stable patterns, the window size may be increased to optimize computational resource usage.

The context integration framework may implement adaptive feature extraction based on observed interaction patterns. For example, the system may modify the importance weights assigned to different context features based on their historical predictive value. Features that consistently contribute to accurate response generation may receive increased weight in future processing, while less informative features may be deprioritized.

According to another aspect of the embodiment, the fusion mechanism may implement dynamic weight adjustment based on historical accuracy metrics. The system may maintain performance histories for different fusion strategies and adjust weighting parameters to favor more successful approaches. For example, in scenarios where short-term context proves more predictive of appropriate responses, the fusion mechanism may incrementally increase the weight assigned to short-term temporal processors.

The system may further implement pattern evolution tracking across multiple time scales. In one embodiment, the long-term processor may maintain a hierarchy of pattern representations, tracking how patterns emerge, evolve, and potentially decay over time. The system may use this evolution history to adjust pattern recognition thresholds and update feature extraction parameters.

According to another aspect of the embodiment, the attention mechanism may implement adaptive focus based on historical attention patterns. The system may track the distribution of attention weights across different context types and temporal scales, adjusting the attention computation parameters to optimize focus on historically relevant features. The attention mechanism may implement graduated parameter updates to maintain stability while allowing for adaptation to changing patterns.

The state management system may implement adaptive checkpoint frequency based on observed state transition patterns. For example, during periods of rapid state changes, the system may increase the frequency of state checkpoints to maintain recovery capability. Conversely, during periods of state stability, the checkpoint frequency may be reduced to optimize resource usage while maintaining system reliability.

According to another aspect of the embodiment, the system implements various strategies for resource allocation and performance optimization across different deployment scenarios. The system may dynamically adjust processing parameters and resource allocation based on computational load, response time requirements, and pattern complexity.

In one embodiment, the system may implement hierarchical resource allocation across temporal processors. The short-term processor may receive priority allocation to maintain responsive real-time processing, while medium-term and long-term processors may operate with flexible processing schedules. The system may implement adaptive batch processing for longer-term analysis, wherein pattern recognition operations are grouped to optimize computational efficiency while maintaining temporal coherence.

The context integration framework may implement selective feature computation based on resource availability. For example, during high-load periods, the system may prioritize computation of high-impact context features while deferring analysis of less critical contextual elements. The system may maintain feature importance histories to inform these priority decisions.

According to another aspect of the embodiment, the fusion mechanism may implement adaptive computation scheduling. In one embodiment, the system may adjust the frequency and depth of fusion operations based on observed pattern volatility and resource availability. During periods of stable patterns, the system may reduce fusion computation frequency while maintaining output consistency through interpolation.

The system may further implement memory management strategies across different temporal scales. For example, the system may employ progressive data compression for historical data, wherein older data may be stored with reduced resolution while maintaining essential pattern information. The compression ratios may be dynamically adjusted based on pattern significance and storage availability.

According to another aspect of the embodiment, the attention mechanism may implement computational optimizations based on attention patterns. The system may maintain sparse attention representations when attention is naturally focused on specific temporal or contextual elements. The attention computation may be optimized through selective key-value pair evaluation based on historical attention patterns.

The system may implement scaling strategies for different deployment scenarios. In one embodiment, the system may adjust its processing architecture based on available computational resources. For example, in resource-constrained environments, the system may operate with reduced temporal resolution or simplified context representations while maintaining essential functionality. In high-resource environments, the system may enable additional processing layers or finer-grained temporal analysis.

The operation of the system is characterized by its ability to adaptively integrate temporal and contextual data to generate responses that are contextually coherent and temporally consistent. According to one embodiment, the input data flows through multiple stages of processing, wherein each stage may implement specialized operations while maintaining synchronization with other stages.

The initial processing stage may implement feature extraction through multiple parallel pathways. The temporal pathway may decompose input data into multiple time scales, wherein immediate events may be processed through high-frequency analysis while historical patterns may undergo hierarchical decomposition. Concurrently, the contextual pathway may extract domain-specific features, entity relationships, and interaction patterns using specialized processors for each context type. The feature extraction stage may implement adaptive sampling rates, wherein processing frequency may be adjusted based on pattern volatility and computational resource availability.

The temporal analysis stage may then process the extracted features across multiple time scales simultaneously. The short-term processor may maintain a high-resolution sliding window for immediate context processing, while medium-term and long-term processors may implement progressive resolution reduction for efficient pattern recognition. Each temporal processor may maintain state information specific to its time scale, enabling independent pattern detection while preserving temporal coherence through cross-scale state synchronization.

According to another aspect of the embodiment, the context integration stage may enrich the temporal data streams with domain knowledge, entity relationships, and interaction patterns. The integration may be implemented through a multi-layer architecture, wherein each layer may process specific context types and maintain corresponding state information. The context processors may implement attention mechanisms to selectively focus on relevant contextual features based on the current temporal state and processing requirements.

The system may dynamically assign processing priorities through a hierarchical resource allocation mechanism. Priority assignment may be based on multiple factors, including pattern significance, temporal relevance, and computational resource availability. The priority mechanism may implement adaptive thresholds, wherein the criteria for priority assignment may be adjusted based on historical processing patterns and system performance metrics.

The fusion stage may implement multi-scale integration of temporal and contextual information through a series of weighted combinations. The weights may be dynamically adjusted based on pattern detection confidence, temporal relevance, and context significance. The fusion mechanism may maintain temporal coherence through state tracking and validation across all processing scales and context types.

According to another aspect of the embodiment, the output generation stage may implement consistency validation through multiple verification layers. Each layer may verify specific aspects of the output, including temporal consistency, contextual coherence, and state validity. The validation mechanism may implement recursive checking, wherein detected inconsistencies may trigger reprocessing at the appropriate stage while maintaining system responsiveness.

The system may further implement continuous adaptation through feedback loops at multiple processing levels. Each processing stage may maintain performance metrics and adjust operational parameters based on historical effectiveness. The adaptation mechanism may implement graduated parameter updates to maintain system stability while enabling continuous optimization of processing efficiency.

The applications of this invention span a wide range of domains where interactive artificial intelligence systems benefit from multi-scale temporal processing and context integration. For instance, in customer service platforms, the system may analyze real-time customer interactions while considering historical preferences and long-term trends to provide personalized responses. In healthcare monitoring systems, it may track immediate vital signs alongside recent medical history and long-term health trends to offer timely and context-aware recommendations. Similarly, in educational platforms, the invention may adapt instructional content by analyzing a student's current progress, recent learning patterns, and overall academic trajectory, enhancing the educational experience. In addition, the invention finds applications in hospitality and restaurant management, where it may analyze customer preferences, past interactions, and operational trends to enhance guest experiences and optimize resource allocation. The examples provided herein are non-limiting and intended to illustrate the diverse fields where the invention can be effectively implemented. These applications demonstrate the versatility of the system in leveraging temporal coherence and contextual awareness to improve decision-making and interaction quality in diverse fields. The system also incorporates an attention mechanism to prioritize and integrate contextual data effectively. The attention mechanism operates by computing relevance scores between elements of input data and context features using a query, key, and value transformation framework. In an embodiment, the query represents a feature derived from the current input data, the keys represent stored context features, and the values contain the corresponding context information. Relevance scores are calculated as the scaled dot-product of the query and key vectors, normalized using a softmax function, and applied to the value vectors to generate weighted outputs. This operation ensures that the system focuses on the most relevant context features for the task at hand.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

The term "temporal scale" as used herein refers to a specific time horizon over which context processing occurs, including immediate context comprising events and states within the current processing cycle, short-term context comprising events and states within a recent time window of up to 24 hours, medium-term context comprising events and states within a time window of up to 30 days, and long-term context comprising events and states beyond 30 days.

The term "context type" as used herein refers to a specific category of contextual information, including domain context comprising field-specific information and rules, entity context comprising information about specific actors or objects, interaction context comprising patterns and histories of interactions, and state context comprising system and component states.

The term "temporal coherence" as used herein refers to the consistent relationship between contextual information across different time scales, maintained through state tracking across time scales, pattern recognition and validation, cross-scale dependency management, and temporal consistency verification.

The term "context integration" as used herein refers to the process of combining different types of context while maintaining semantic relationships, preserving temporal dependencies, ensuring state consistency, and supporting pattern evolution.

The term "fusion" as used herein refers to the process of combining multiple sources of information, including temporal fusion across time scales, context fusion across context types, cross-integration of temporal and contextual information, and state and pattern integration.

The term "pattern" as used herein refers to recurring structures or relationships in data, characterized by temporal consistency requirements, context-specific validation criteria, evolution tracking parameters, and significance thresholds.

The term "state" as used herein refers to the configuration of system components at any given time, including component-specific states, cross-component relationships, temporal dependencies, and context dependencies.

The term "processor" as used herein refers to specialized computational units that operate on specific temporal scales, process specific context types, maintain dedicated state information, and implement defined interfaces.

The term "weight" as used herein refers to numerical values that determine relative importance of information, guide fusion operations, control state transitions, and influence pattern recognition.

The term "coherent output" as used herein refers to system responses that maintain temporal consistency across scales, context consistency across types, state consistency across components, and pattern consistency across time.

As used herein, "processing scale" refers to a specific computational window or scope over which data analysis and pattern recognition operations are performed, including but not limited to immediate processing comprising current input data, short-term processing comprising recent historical data up to 24 hours, medium-term processing comprising historical data up to 30 days, and long-term processing comprising historical data beyond 30 days.

As used herein, "coherent output" refers to a system response or result that maintains consistency across temporal scales, context types, and system states while preserving logical relationships and dependencies between different elements of the processed data.

As used herein, "cross-scale integration" refers to the process of combining and reconciling data, patterns, or states from different temporal scales or context types while maintaining temporal coherence and logical consistency across the integrated elements.

As used herein, "attention weight" refers to a numerical value that determines the relative importance or influence of specific data elements, features, or patterns during processing operations, including but not limited to temporal weights, context weights, and fusion weights.

As used herein, "state transition" refers to a change in system configuration, context representation, or processing status that is tracked, validated, and synchronized across system components to maintain operational coherence.

As used herein, "pattern evolution" refers to the process of tracking and analyzing how identified patterns, relationships, or trends change over time across different temporal scales and context types.

As used herein, "context representation" refers to a structured encoding of contextual information that captures relevant features, relationships, and states for a specific context type, including but not limited to domain context, entity context, and interaction context.

Conceptual Architecture

Figure 1:
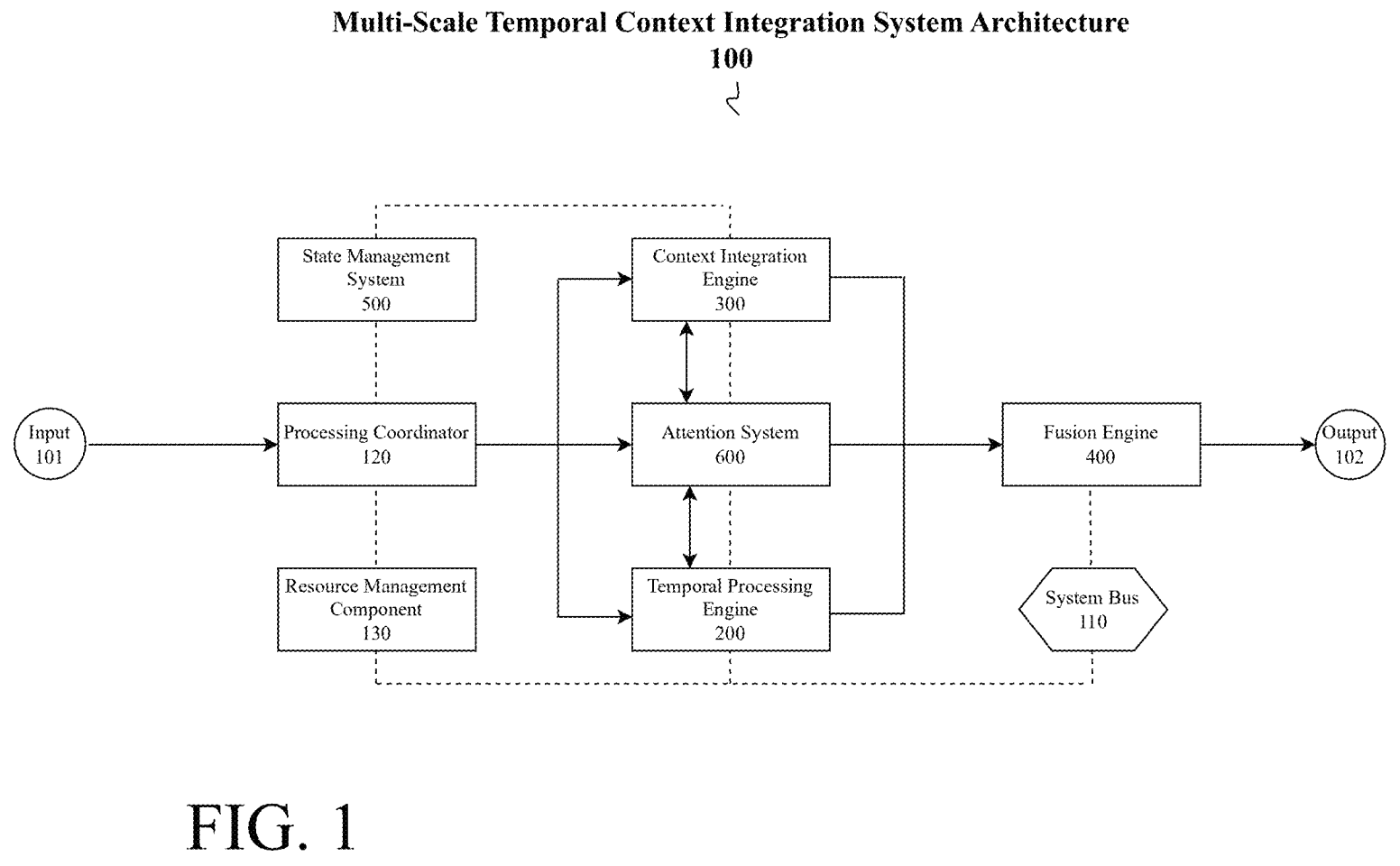

FIG. 1 is a block diagram illustrating exemplary architecture of multi-scale temporal context integration system 100, in an embodiment. System 100 facilitates the processing and integration of temporal and contextual data across multiple time scales while maintaining state coherence and operational efficiency. Input data 101 flows into system 100 and is received by processing coordinator 120. Processing coordinator 120 distributes input data to attention system 600, temporal processing engine 200, and context integration engine 300.

Attention system 600 analyzes the input data to identify priority elements and adjust processing focus accordingly. Temporal processing engine 200 processes the input data across distinct time scales using short-term processor 210, medium-term processor 220, and long-term processor 230. These processors operate concurrently to extract patterns, maintain state transitions, and track temporal coherence across immediate, recent, and extended historical contexts. Context integration engine 300 processes the input data to extract domain-specific, entity-specific, and interaction-specific contextual information. Outputs from these subsystems represent structured data representing relationships, patterns, and context features relevant to the input data.

Fusion engine 400 integrates outputs from temporal processing engine 200 and context integration engine 300 to generate coherent outputs while dynamically assigning weights to various time scales and context types based on relevance. State management system 500 maintains synchronization and consistency of state information across all subsystems, ensuring data integrity and temporal coherence throughout the processing cycle. Resource management component 130 monitors computational load and allocates processing resources efficiently to meet system requirements and operational constraints. System bus 110 facilitates communication between all subsystems and components, ensuring seamless data flow and coordination across system 100.

Output data 102 is produced by fusion engine 400 after validating the integrated results for coherence and consistency. This architecture enables system 100 to handle complex multi-scale temporal and contextual data processing tasks while maintaining adaptive responsiveness and state integrity.

Data flows through the multi-scale temporal context integration system 100 in a coordinated and synchronized manner to ensure efficient processing and integration of temporal and contextual information. Input data 101 enters system 100 and is received by processing coordinator 120, which distributes the input across attention system 600, temporal processing engine 200, and context integration engine 300.

Attention system 600 analyzes the input to determine areas of focus and assigns processing priorities for downstream components. This subsystem generates attention weights that guide the allocation of computational resources and influence how input data is processed across different temporal scales and context types.

Temporal processing engine 200 processes input data across short-term processor 210, medium-term processor 220, and long-term processor 230. Short-term processor 210 analyzes immediate events, tracking state transitions and detecting patterns in real-time. Medium-term processor 220 integrates data over recent timeframes to identify evolving trends and ensure temporal coherence within intermediate horizons. Long-term processor 230 analyzes extended historical data to detect persistent patterns, manage state information, and ensure temporal consistency across broader timeframes. Outputs from these processors include time-specific state updates and patterns reflective of their respective processing scales.

Simultaneously, context integration engine 300 processes domain-specific, entity-specific, and interaction-specific information. Domain context processor within context integration engine 300 extracts features related to predefined rules, industry standards, or field-specific knowledge. Entity context processor maps relationships and tracks the states of relevant entities. Interaction context processor identifies patterns and dependencies in interactions over time, ensuring that temporal and contextual dynamics are captured comprehensively.

Outputs from temporal processing engine 200 and context integration engine 300 are delivered to fusion engine 400. Fusion engine 400 combines temporal outputs and context representations into a unified result, dynamically adjusting weights to prioritize the most relevant temporal scales and context features. The fusion process ensures temporal coherence and contextual alignment by reconciling dependencies and validating the integrated output against state information maintained by state management system 500.

State management system 500 operates continuously to synchronize state information across all subsystems, track state transitions, and resolve inconsistencies. This subsystem ensures that the system maintains operational integrity and coherence throughout the data flow. Resource management component 130 monitors system resource utilization and dynamically adjusts allocations to maintain optimal performance under varying computational loads.

The final output data 102 is generated by fusion engine 400 and represents a coherent and contextually integrated response that incorporates immediate, short-term, medium-term, and long-term temporal insights along with domain, entity, and interaction-specific contextual information. This output is validated for consistency and accuracy before being made available for downstream processes or external systems.

FIG. 2 is a block diagram illustrating exemplary architecture of temporal processing framework 200, in an embodiment. Temporal processing framework 200 facilitates multi-scale temporal analysis by processing input data 201 across short-term processor 210, medium-term processor 220, and long-term processor 230 while ensuring coordination and temporal coherence through cross-scale components 240. Input distribution component 205 routes input data 201 to all three temporal processors simultaneously, enabling parallel processing of immediate, recent, and extended historical data.

In short-term processor 210, real-time buffer component 211 receives and holds immediate data, providing a steady stream of information for immediate analysis. For example, real-time buffer component 211 may implement a circular buffer structure to handle continuous incoming data efficiently, discarding older entries as new data arrives to maintain freshness. Immediate state tracker 212 maintains state information relevant to the current context, which may include tracking transient system states, such as user activity or rapidly changing sensor inputs. Pattern detection engine 213 identifies immediate patterns within the data by applying algorithms such as sliding window correlation or fast Fourier transforms, in an embodiment. These patterns are passed to state update engine 214, which refines state information in real-time by incorporating new data into the existing state representation. Priority management component 215 guides processing priorities within short-term processor 210, for example, by dynamically adjusting computation focus based on predefined criteria, such as criticality of detected patterns or available system resources, ensuring responsiveness to dynamic changes.

Medium-term processor 220 receives recent historical data from historical buffer component 221, which maintains a rolling window of data for intermediate analysis. For instance, historical buffer component 221 may group data into time buckets, enabling efficient aggregation and retrieval of data for pattern analysis. Pattern evolution tracker 222 monitors how patterns develop over recent timeframes, providing insights into emerging trends. In an embodiment, this tracker may apply time-series analysis or trend-line fitting to identify shifts or progressions in observed patterns. State transition engine 223 manages state changes specific to this temporal scale by updating and reconciling intermediate states with both short-term and long-term data, ensuring consistency and alignment across scales. For example, state transition engine 223 may implement rule-based logic or machine learning models to validate and propagate state changes.

Long-term processor 230 analyzes extended historical data with support from compression engine 231, which optimizes older data for efficient storage and analysis. Compression engine 231, in an embodiment, may apply techniques such as wavelet transformations or dimensionality reduction to retain significant features while discarding redundant or less relevant information. Trend analysis component 232 identifies long-term trends by leveraging historical data aggregated over extended periods, which may include recognizing cyclical patterns, seasonal behaviors, or gradual shifts in underlying data distributions. Pattern repository system 233 stores recognized patterns for future reference, enabling persistent insights that can be revisited or refined as new data emerges. Historical state archive 234 maintains persistent state information over extended time horizons, supporting consistency in long-term analysis by ensuring that critical states remain accessible even as data ages. Pattern evolution tracker 235 monitors changes in long-term patterns by comparing historical trends with recent observations to detect anomalies or significant deviations. Data pruning engine 236 removes irrelevant historical data by applying configurable rules or thresholds, ensuring efficient use of resources while preserving essential information.

Cross-scale components 240 coordinate operations across the three temporal processors to ensure alignment and coherence. State synchronization mechanism 241 ensures state consistency by aligning state information across different time scales, which may include resolving conflicts between short-term, medium-term, and long-term states. For example, it may implement consensus algorithms to validate updates across scales. Pattern correlation engine 242 identifies relationships between patterns detected at various temporal scales by performing cross-correlation analysis or hierarchical clustering, in an embodiment. Temporal coherence validator 243 maintains consistency across time scales by ensuring that outputs from the processors reflect a unified temporal narrative. For instance, it may reconcile overlapping or conflicting temporal insights into a coherent representation. Scale transition manager 244 oversees transitions between time scales by dynamically adjusting data granularity or processing windows, facilitating seamless integration of data processed at different temporal granularities.

Integration component 250 combines outputs from short-term processor 210, medium-term processor 220, and long-term processor 230 into a unified result. This combination may include assigning dynamic weights to the outputs based on their relative relevance or significance for a given task. For example, the integration component may prioritize short-term insights for immediate responsiveness while incorporating long-term trends for strategic consistency. Output 202 reflects coherent and comprehensive temporal insights derived from processing data across multiple time scales. This framework ensures adaptive and robust temporal analysis, enabling effective integration of immediate, intermediate, and historical contexts to support a wide range of applications.

In an embodiment, temporal processing framework 200 may include machine learning models to enhance pattern recognition, state tracking, and trend analysis across various time scales. For example, short-term processor 210 may employ recurrent neural networks (RNNs) or gated recurrent units (GRUs) to analyze sequential data in real-time and capture transient patterns within immediate contexts. These models may, for example, be trained on high-frequency event streams such as user interaction logs or sensor data. Training may use supervised learning techniques with labeled sequences that identify specific patterns or state transitions relevant to immediate temporal horizons.

Medium-term processor 220 may incorporate convolutional neural networks (CNNs) or temporal convolutional networks (TCNs) to analyze aggregated data within a rolling window. These models may detect evolving trends or intermediate patterns by processing time-series data spanning hours or days. For example, training datasets may include operational logs or recent interaction histories annotated with mid-term state transitions or anomaly indicators. Model optimization may involve methods such as backpropagation and stochastic gradient descent (SGD), ensuring effective detection of meaningful features within the medium-term timeframe.

Long-term processor 230 may include unsupervised learning models, such as autoencoders or clustering algorithms, to extract and analyze long-term patterns. For example, autoencoders may compress extended historical data while preserving critical features, enabling efficient storage and analysis. Clustering algorithms, such as k-means or hierarchical clustering, may identify groups of related patterns or trends across extended time horizons. Training data for these models may include multi-month or multi-year historical records, such as customer behavior trends or seasonal variations, allowing the system to adapt to persistent or recurring phenomena without requiring explicit labels.

The training of machine learning models within temporal processing framework 200 may utilize a combination of local and distributed environments. For example, short-term and medium-term models may be fine-tuned locally for responsiveness, while long-term models may leverage distributed cloud-based systems for large-scale training on comprehensive datasets. Adaptive learning techniques may be employed, enabling the models to update their parameters dynamically as new data is processed, ensuring alignment with evolving temporal patterns.

By incorporating machine learning models, temporal processing framework 200 may dynamically adapt to complex temporal dynamics, enabling robust pattern detection, state management, and trend analysis across short-term, medium-term, and long-term timescales.

Data flow through temporal processing framework 200 begins when input data 201 enters input distribution component 205, which routes the data simultaneously to short-term processor 210, medium-term processor 220, and long-term processor 230 for parallel processing. In short-term processor 210, real-time buffer component 211 receives and temporarily holds immediate data, ensuring a steady flow for analysis. Immediate state tracker 212 maintains the current state, while pattern detection engine 213 identifies patterns emerging in real-time. These patterns are used by state update engine 214 to refine state information dynamically. Priority management component 215 guides processing focus within the short-term processor, ensuring high-priority data receives timely attention.

In medium-term processor 220, historical buffer component 221 manages a rolling window of recent data, making it available for intermediate-scale analysis. Pattern evolution tracker 222 monitors changes and developments in patterns over this timeframe, while state transition engine 223 updates state information to reflect shifts in the medium-term context. These components work in coordination to identify and track trends as they emerge and stabilize.

Long-term processor 230 processes extended historical data with the help of compression engine 231, which optimizes data storage by reducing redundancy. Trend analysis component 232 identifies persistent or recurring trends, while pattern repository system 233 stores these trends for long-term reference. Historical state archive 234 maintains durable state information over extended timeframes, enabling consistent integration of long-term insights. Pattern evolution tracker 235 monitors how these patterns change over time, and data pruning engine 236 removes data deemed irrelevant to preserve storage and computational resources.

Cross-scale components 240 operate throughout the framework to coordinate data processing and ensure alignment between the three temporal processors. State synchronization mechanism 241 aligns state information across temporal scales, while pattern correlation engine 242 identifies relationships between patterns detected at different scales. Temporal coherence validator 243 ensures that outputs from the processors remain consistent across time horizons, and scale transition manager 244 facilitates smooth transitions between scales, ensuring seamless integration of data.

Finally, integration component 250 receives outputs from all three temporal processors and combines them into a unified representation. This output, labeled 202, reflects the coherent and comprehensive temporal analysis performed across short-term, medium-term, and long-term timescales, maintaining consistency and relevance for downstream applications.

Figure 3:
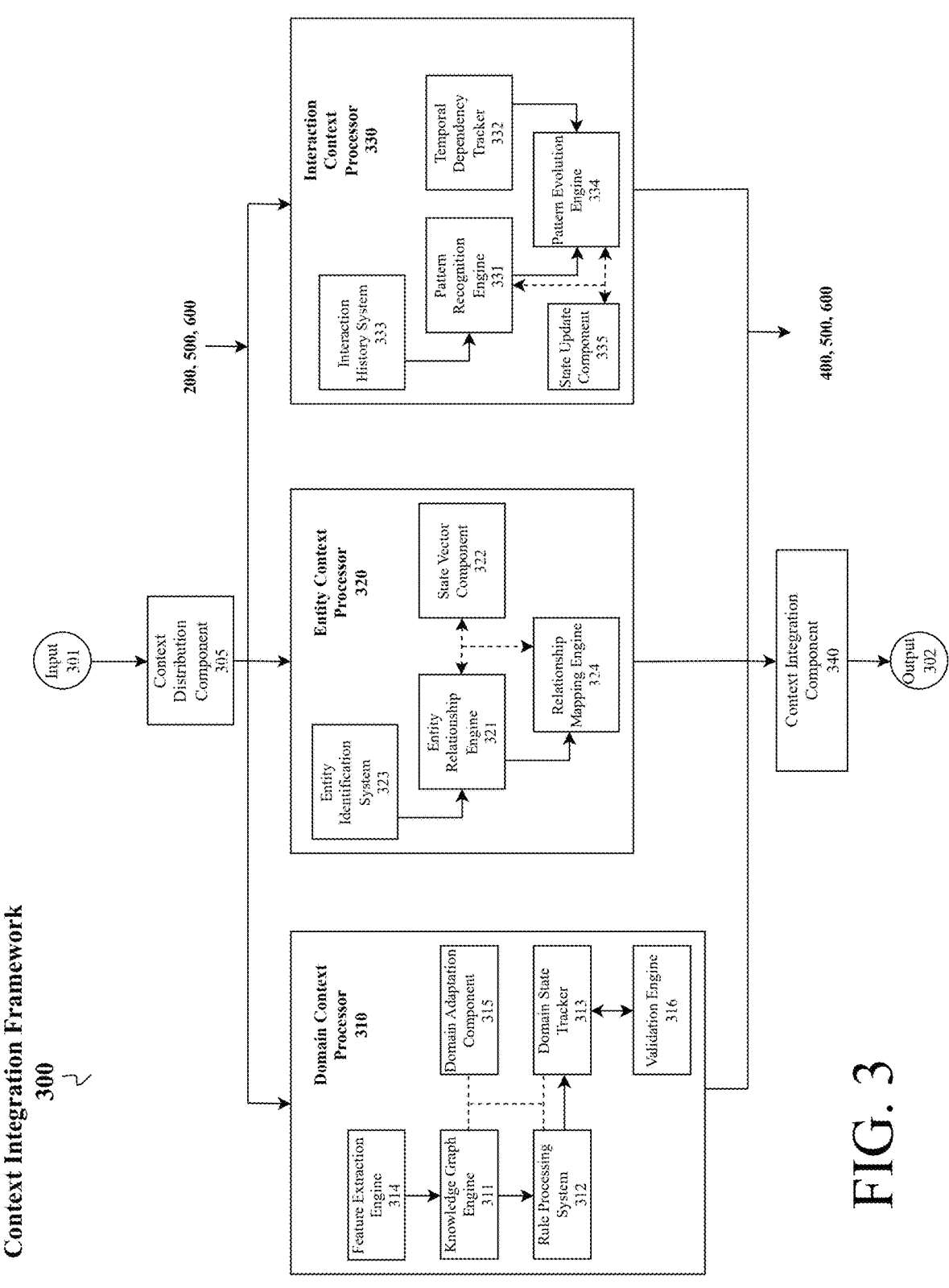
FIG. 3 is a block diagram illustrating exemplary architecture of context integration framework.

FIG. 3 is a block diagram illustrating exemplary architecture of context integration framework 300, in an embodiment. Context integration framework 300 processes input data 301 and produces unified context output 302 by leveraging multiple context-specific subsystems operating in parallel. Input data 301 enters through context distribution subsystem 305, which routes the data to three parallel context processors: domain context processor 310, entity context processor 320, and interaction context processor 330.

Context distribution subsystem 305 facilitates the initial routing of input data 301 within context integration framework 300 by directing relevant portions of the data to the appropriate processors for domain, entity, and interaction contexts. This subsystem may, in an embodiment, include pre-processing mechanisms to filter, classify, or tag input data based on predefined criteria or dynamic analysis. For example, textual data may be parsed and annotated to identify entities, domain-specific keywords, or interaction markers before distribution. Context distribution subsystem

305 may implement feature extraction or categorization techniques, such as tokenization, semantic analysis, or data type identification, to allocate data efficiently to domain context processor 310, entity context processor 320, and interaction context processor 330. Additionally, the subsystem may include load-balancing mechanisms to manage computational resources, ensuring that no single processor is overwhelmed during high-volume operations. In some embodiments, context distribution subsystem 305 dynamically adapts its routing strategy based on feedback from downstream processors, such as prioritizing real-time interaction data during periods of heightened user activity or routing additional resources to domain processing during updates to domain-specific rules. This subsystem operates as a central hub for data intake and ensures that input data is optimally divided and routed for efficient and coherent processing across the context integration framework.

Domain context processor 310 receives input data from context distribution subsystem 305 and processes domain-specific information. Knowledge graph engine 311, for example, may map domain features such as keywords, ontologies, or hierarchies into structured domain knowledge by utilizing predefined schemas or dynamically learned relationships. Rule processing system 312 may include, in an embodiment, mechanisms for applying industry standards, regulatory guidelines, or business rules to refine domain understanding. For instance, the rule processing system could validate compliance with financial reporting standards or enforce constraints within an industrial setting. Domain state tracker 313 maintains current state information related to domain-specific entities and relationships, which may involve tracking changes over time to reflect updates in real-world scenarios, such as inventory levels or customer preferences. Feature extraction engine 314 extracts domain-relevant features from input data, such as identifying critical attributes in medical records or transaction logs, and may implement techniques like natural language processing or statistical analysis. Domain adaptation component 315 dynamically adjusts processing parameters based on changes in domain context, such as shifts in user preferences or market trends, by leveraging feedback loops or real-time analytics. Validation engine 316 ensures consistency and accuracy of the domain-specific output by applying verification techniques, which may include cross-referencing domain outputs with known benchmarks or validation datasets before passing the processed data to context integration subsystem 340.

Entity context processor 320 identifies and processes entity-specific information. Entity identification system 323 extracts relevant entities from input data, which may include names, identifiers, or object tags, and could employ techniques such as named entity recognition or pattern matching. Entity relationship engine 321 determines relationships between identified entities by analyzing attributes, interactions, or structural dependencies, which may involve constructing entity graphs or calculating proximity measures within datasets. State vector component 322 tracks state information for each entity, maintaining representations of properties such as status, operational metrics, or dynamic attributes over time. For example, a customer entity's state might include their purchase history, preferences, and interaction frequency, while a physical asset entity might track usage data and maintenance schedules. Relationship mapping engine 324 generates structured representations of entity interactions and dependencies, which may involve encoding connections in matrices, graphs, or other structured formats. Outputs of entity context processor 320 are provided to context integration subsystem 340 for further processing, enabling downstream systems to leverage comprehensive and structured entity insights.

Interaction context processor 330 handles temporal and pattern-based interaction data. Interaction history system 333 maintains records of previous interactions, which may include time-stamped logs, annotated records, or summaries of communication exchanges. This subsystem can store data in optimized structures such as rolling windows, time-series databases, or interaction graphs to facilitate efficient retrieval and analysis. Pattern recognition engine 331 identifies recurring interaction patterns, which may involve detecting repetitive behaviors, correlations, or sequences, such as recurring customer inquiries or seasonal purchasing trends, using machine learning models or rule-based approaches. Temporal dependency tracker 332 analyzes time-based dependencies in interaction data, such as identifying causality or lag relationships between events, and may employ time-series analysis techniques or causal inference models. Pattern evolution engine 334 monitors changes or trends in interaction patterns over time, identifying shifts that may indicate emerging behaviors or anomalies, such as evolving customer preferences or deviations in operational workflows. State update component 335 manages state information associated with interaction contexts, ensuring temporal coherence by reconciling updates from recent interactions with historical data and maintaining consistent states across multiple contexts. Outputs of interaction context processor 330 are directed to context integration subsystem 340, providing enriched interaction data for downstream processing.

Context integration subsystem 340 receives outputs from domain context processor 310, entity context processor 320, and interaction context processor 330. Integration subsystem 340 combines these outputs into a unified context representation by reconciling relationships, resolving inconsistencies, and ensuring alignment across different context types. For example, it may assign higher weights to short-term interaction data when immediate responsiveness is required, while giving more significance to long-term trends in strategic decision-making. The integration process may include advanced fusion techniques, such as multi-head attention mechanisms, hierarchical merging, or statistical weighting, to prioritize relevant inputs. Internal mechanisms may dynamically adjust weights assigned to each context type based on real-time feedback, identified patterns, or system-level priorities. Context integration subsystem 340 produces unified context output 302, which is delivered to downstream components such as fusion engine 400 for combining with temporal data or state management system 500 for maintaining system-wide coherence and enabling adaptive responses.

Machine learning models may be utilized within context integration framework 300 to enhance the functionality and adaptability of its subsystems. In an embodiment, domain context processor 310 may employ models such as neural networks, decision trees, or support vector machines to classify domain-specific data and extract relevant features. For example, a neural network may be trained to map textual input to specific domain categories, such as legal, medical, or financial domains, based on labeled datasets containing annotated examples of domain-related content. Similarly, rule processing system 312 may utilize reinforcement learning to adaptively refine rule application based on feedback from validation engine 316, optimizing its decisions over time as new data becomes available.

Entity context processor 320 may leverage machine learning models to identify entities, detect relationships, and maintain state information. For example, named entity recognition models based on transformer architectures, such as BERT or GPT, may be trained on datasets comprising labeled text to identify and classify entities like names, organizations, or product identifiers. Relationship mapping engine 324 may utilize graph neural networks to infer and represent connections between entities, enabling it to identify complex dependencies in large datasets. These models may be trained using relational data, such as knowledge graphs, transactional logs, or annotated interaction records, ensuring robust handling of entity-specific information.

Interaction context processor 330 may incorporate sequence models, such as recurrent neural networks (RNNs) or temporal convolutional networks (TCNs), to analyze interaction history and identify patterns over time. For example, a TCN may be trained on time-stamped interaction logs to detect recurring patterns, such as customer inquiries that follow seasonal trends. Temporal dependency tracker 332 may use models like hidden Markov models or attention-based mechanisms to capture causal or sequential relationships between events. Training data for these models may include historical interaction datasets enriched with metadata, such as timestamps, user IDs, or interaction types, allowing the models to learn the dynamics of time-dependent processes.

The training of these machine learning models may be performed using supervised, unsupervised, or semi-supervised learning techniques, depending on the availability of labeled data. For example, supervised learning may be used for classification tasks, such as mapping input data to predefined categories or labels, while unsupervised learning may be applied to discover hidden patterns in large, unlabeled datasets, such as clustering entities based on shared characteristics. Semi-supervised learning may be utilized when only a subset of data is labeled, enabling the models to leverage both labeled and unlabeled examples to improve accuracy. The training process may involve standard techniques, such as gradient descent for optimizing model parameters, and may utilize frameworks like TensorFlow, PyTorch, or scikit-learn.

In addition to offline training, certain machine learning models within context integration framework 300 may be updated through online or incremental learning. For example, pattern recognition engine 331 may continuously adapt its models based on real-time data streams, refining its ability to identify evolving interaction patterns. Training datasets for this purpose may be augmented over time with newly acquired data, ensuring the models remain relevant and effective in dynamic environments. Feedback loops from validation components, such as validation engine 316 or state update component 335, may also provide iterative refinements, enabling adaptive learning within the system.

These machine learning capabilities enhance the overall flexibility, accuracy, and scalability of context integration framework 300, enabling it to process diverse and dynamic data inputs while maintaining coherence and relevance across its subsystems.

Data flow through context integration framework 300 begins when input data 301 is received by context distribution subsystem 305, which processes and routes the data to domain context processor 310, entity context processor 320, and interaction context processor 330 for parallel processing. Within domain context processor 310, knowledge graph engine 311 maps domain-relevant features from the input data to structured domain knowledge, while rule processing system 312 applies applicable rules or standards to refine the domain-specific insights. Extracted domain features and state information are maintained by feature extraction engine 314 and domain state tracker 313, respectively, ensuring that changes in domain context are dynamically incorporated by domain adaptation component 315. Entity context processor 320 processes the input data by identifying entities with entity identification system 323, determining relationships through entity relationship engine 321, and maintaining states with state vector component 322. Interaction context processor 330 concurrently analyzes interaction-specific data, with interaction history system 333 managing past records, pattern recognition engine 331 identifying recurring patterns, and temporal dependency tracker 332 capturing sequential dependencies within interactions. Outputs from these processors are directed to context integration subsystem 340, which combines the processed data into a unified context representation by reconciling inconsistencies, resolving cross-context relationships, and assigning appropriate weights to the contributions of each processor. The resulting unified context output 302 is then forwarded to downstream components, such as fusion engine 400, where it is integrated with temporal data for further processing, or to state management system 500, where it contributes to maintaining system coherence and facilitating adaptive responses. This coordinated flow ensures that context integration framework 300 processes data effectively across multiple dimensions while maintaining alignment and coherence among its components.

Figure 4:
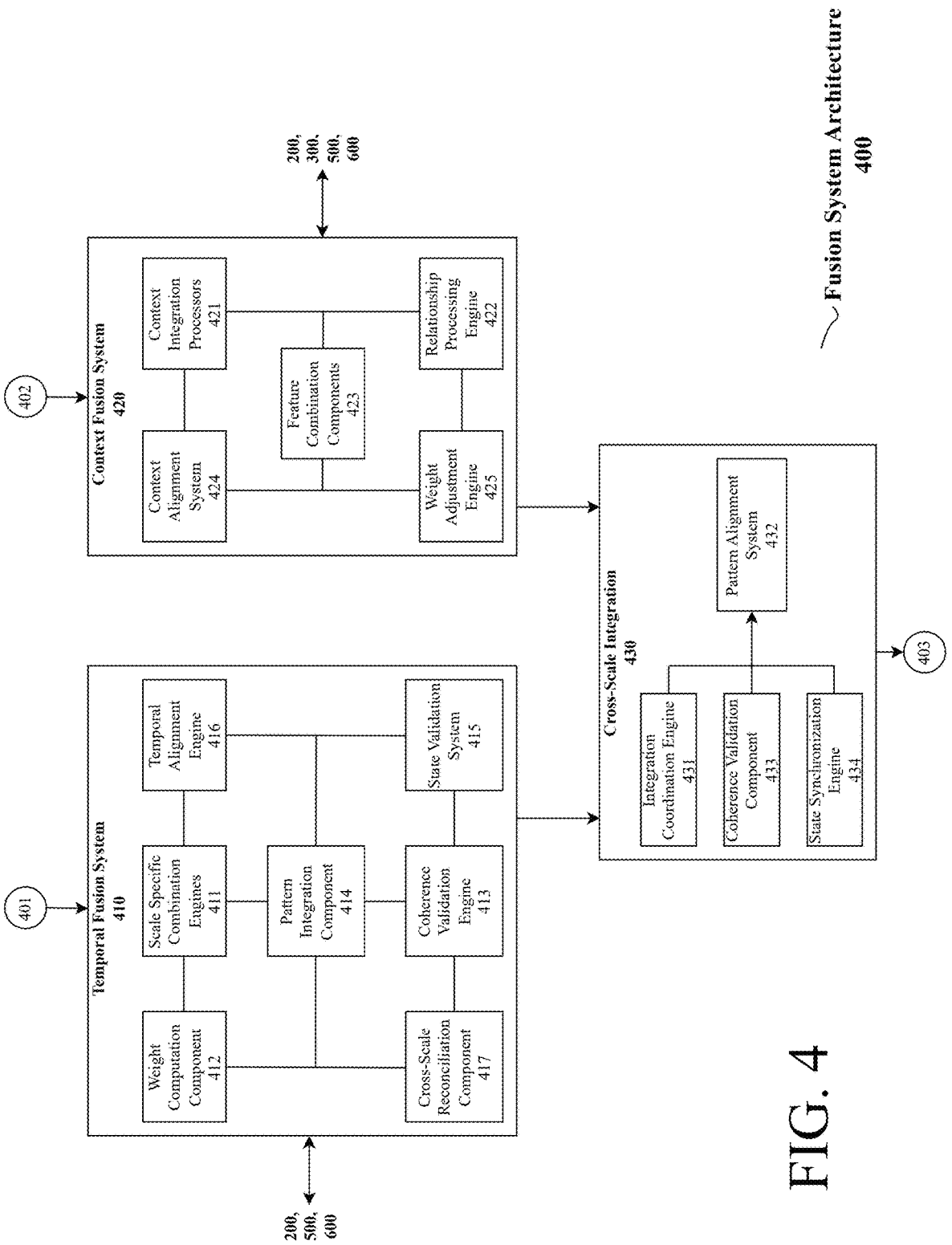
FIG. 4 is a block diagram illustrating exemplary architecture of fusion system.

FIG. 4 is a block diagram illustrating exemplary architecture of fusion system 400, in an embodiment. Fusion system 400 integrates temporal input 401 from temporal processing engine 200 and context input 402 from context integration engine 300 to generate coherent outputs that maintain temporal coherence and contextual consistency. Fusion system 400 operates with three primary subsystems: temporal fusion system 410, context fusion system 420, and cross-scale integration subsystem 430, which interact to process and reconcile data from the contributing systems.

Temporal input 401 is processed by temporal fusion system 410, which manages alignment and reconciliation of data across multiple time scales. Temporal alignment engine 416, for example, ensures synchronization by coordinating outputs from short-term processor 210, medium-term processor 220, and long-term processor 230. This may include aligning timestamps, reconciling overlapping data windows, and ensuring that state transitions occurring across time scales are accurately represented. In an embodiment, temporal alignment engine 416 may implement adaptive alignment techniques that dynamically adjust based on detected temporal patterns or inconsistencies in input data streams. Scale-specific combination engines 411 integrate outputs from different temporal scales by assigning relative importance to each time scale, guided by weights dynamically calculated by weight computation component 412. For instance, during periods of rapid pattern evolution, higher weights may be assigned to outputs from short-term processor 210, while stable trends may result in greater reliance on long-term processor 230 outputs. Weight computation component 412 may employ machine learning algorithms or rule-based systems to identify pattern relevance and assign weights accordingly. Pattern integration component 414 identifies recurring or significant patterns across temporal scales, which may include, in an embodiment, recognizing cyclical trends, detecting abrupt changes, or correlating events spanning different time horizons. Coherence validation engine 413 verifies temporal coherence by analyzing dependencies and ensuring that the integrated temporal output reflects a unified temporal narrative. This process may involve comparing predicted patterns with observed data, reconciling anomalies, or employing consistency-checking algorithms to validate inter-scale transitions. Cross-scale reconciliation component 417 resolves discrepancies between outputs from different time scales, which may include reconciling conflicting state transitions or smoothing out abrupt shifts in data continuity. For example, discrepancies in pattern recognition between medium-term processor 220 and long-term processor 230 may be addressed through iterative validation or weighted averaging. State validation system 415 confirms that integrated temporal outputs are consistent with state information maintained by state management system 500, ensuring system-wide alignment of temporal states. This validation may include checking for persistent state transitions, verifying historical accuracy, or implementing rollback mechanisms to address inconsistencies.

Context input 402 is processed by context fusion system 420, which aligns and combines data from domain context processor 310, entity context processor 320, and interaction context processor 330. Context integration processors 421 reconcile representations from these processors by identifying common features, aligning context-specific patterns, and integrating shared relationships across contexts. For instance, data from entity context processor 320 may include relationships between specific entities, such as customers or assets, while domain context processor 310 may provide regulatory or rule-based constraints that influence these relationships. In an embodiment, context integration processors 421 may prioritize context elements dynamically based on their relevance to the overall integration. Relationship processing engine 422 identifies and resolves dependencies between contexts, which may include reconciling conflicting entity relationships, mapping overlapping domain constraints, or identifying emergent interaction patterns. This process may involve generating graph-based representations of inter-contextual relationships or applying statistical models to assess dependency strength. Feature combination component 423 merges features from different contexts by harmonizing their representations, which may include transforming domain-specific features into embeddings that are compatible with entity and interaction contexts. Context alignment system 424 ensures consistency across varied representations by dynamically addressing discrepancies, such as differences in granularity or format, and adjusting alignment parameters to preserve semantic coherence. In an embodiment, context alignment system 424 may incorporate attention mechanisms to focus on the most relevant contextual features for integration. Weight adjustment engine 425 calculates and updates weights assigned to different contexts based on identified patterns in context input 402. For example, significant recent interaction patterns may be prioritized over static domain rules when generating real-time outputs. Context fusion system 420 integrates these components to produce a unified contextual representation that aligns with temporal patterns and dependencies, ensuring the resulting output reflects coherent relationships across contexts.

Cross-scale integration subsystem 430 integrates the processed outputs from temporal fusion system 410 and context fusion system 420. Integration coordination engine 431 manages alignment and merging of temporal and contextual data by orchestrating communication between subsystems and determining how outputs are combined. For example, integration coordination engine 431 may use dependency graphs to map temporal patterns to contextual relationships, ensuring compatibility and coherence. Pattern alignment system 432 aligns temporal patterns and contextual relationships by reconciling differences in scale, resolution, or granularity. This may include identifying shared patterns, such as recurring interaction cycles that align with temporal trends, and ensuring consistency between the integrated dimensions. Coherence validation component 433 evaluates consistency across temporal and contextual dimensions by verifying that integrated data maintains logical dependencies and reflects observed patterns accurately. In an embodiment, coherence validation component 433 may apply multi-dimensional consistency checks to ensure that outputs align with both temporal states and contextual features. State synchronization engine 434 maintains alignment of state information across the integrated temporal and contextual systems, ensuring that state transitions and updates are propagated correctly. This process may involve leveraging inputs from state management system 500 to synchronize local states across subsystems, validate state changes, and resolve any inconsistencies that arise during integration.

Fusion system 400 interacts dynamically with other systems in the architecture to facilitate seamless integration of temporal and contextual data. Temporal processing engine 200 provides temporal input 401 to temporal fusion system 410, enabling the alignment, combination, and validation of data across multiple time scales. This interaction ensures that outputs from short-term processor 210, medium-term processor 220, and long-term processor 230 are incorporated into a unified temporal representation. Context integration engine 300 provides context input 402 to context fusion system 420, allowing the reconciliation and merging of data from domain context processor 310, entity context processor 320, and interaction context processor 330. Fusion system 400 communicates with state management system 500 through state validation system 415 and state synchronization engine 434 to ensure that integrated outputs reflect consistent state information and align with system-wide states. Additionally, weight computation and adjustment mechanisms within fusion system 400 interact with attention system 600 to dynamically adjust processing priorities and optimize the integration of temporal and contextual inputs. Outputs generated by fusion system 400 serve as inputs for downstream systems, supporting coherent, adaptive decision-making and enabling real-time responses based on integrated insights from temporal and contextual dimensions. This interconnected operation ensures that fusion system 400 acts as a central hub for synthesizing data, maintaining consistency, and supporting overall system coherence.

In an embodiment, fusion system 400 may utilize machine learning models to enhance the integration and reconciliation of temporal and contextual data. For example, temporal fusion system 410 may incorporate recurrent neural networks (RNNs) or long short-term memory networks (LSTMs) to process sequential data from temporal input 401, identifying patterns and dependencies across short-term, medium-term, and long-term processors. These models may be trained on datasets comprising sequential data such as user interaction logs, sensor data streams, or time-series records, allowing them to capture temporal relationships and adapt dynamically to changing patterns. In an embodiment, scale-specific combination engines 411 may employ reinforcement learning to optimize weight assignments for outputs from different time scales, where the reward function is designed to maximize the coherence and relevance of the integrated temporal output.

Context fusion system 420 may utilize transformer-based models or attention mechanisms, for example, to process context input 402. These models may, for example, include multi-head attention layers to prioritize significant features across domain, entity, and interaction contexts. Training for such models may involve datasets containing structured and unstructured context-specific data, such as knowledge graphs, relational databases, annotated interaction logs, or domain-specific text corpora. In an embodiment, relationship processing engine 422 may employ graph neural networks (GNNs) to model dependencies between contexts, training on data that represents relationships between entities, such as social networks, customer-product interaction graphs, or event dependency maps.

For integration tasks within cross-scale integration subsystem 430, fusion system 400 may employ unsupervised learning models, such as autoencoders or clustering algorithms, to reconcile patterns and align relationships between temporal and contextual data. These models may be trained, for example, on data that reflects cross-dimensional correlations, such as synchronized temporal and contextual event logs or co-occurrence matrices derived from historical interactions. In an embodiment, coherence validation component 433 may use supervised learning models, trained on labeled datasets containing examples of coherent and non-coherent integrations, to evaluate the consistency of the combined outputs.

Training of machine learning models within fusion system 400 may be performed using a combination of supervised, unsupervised, or semi-supervised approaches, depending on the availability and nature of labeled data. For example, supervised learning may be applied to pattern detection models using labeled time-series data with annotated patterns, while unsupervised learning may be used for clustering models to group similar context features without predefined labels. Semi-supervised learning may, for instance, be employed for models that require generalization across both labeled and unlabeled data, such as combining domain-specific rules with interaction patterns in partially annotated datasets. Training datasets may be sourced from historical logs, domain-specific repositories, or generated synthetically to simulate complex temporal and contextual scenarios.

In an embodiment, fusion system 400 may incorporate transfer learning to accelerate the training process by leveraging pre-trained models. For instance, transformer models pre-trained on large text corpora may be fine-tuned for specific domain contexts using smaller, domain-specific datasets. Additionally, active learning techniques may be used to iteratively refine models, where the system selects the most informative data samples for labeling and retraining, improving model accuracy and efficiency in data-scarce environments. Models used in fusion system 400 may also include mechanisms for online learning, allowing them to adapt to new data streams and evolving patterns in real time, ensuring that the system remains responsive and effective in dynamic operational environments.

Data flows through fusion system 400 as it integrates temporal input 401 from temporal processing engine 200 and context input 402 from context integration engine 300 to produce a coherent, unified output that informs downstream processes and decision-making systems. Temporal input 401 enters temporal fusion system 410, where temporal alignment engine 416 synchronizes data from short-term processor 210, medium-term processor 220, and long-term processor 230. Outputs from these processors are integrated by scale-specific combination engines 411, guided by dynamically calculated weights from weight computation component 412. Temporal patterns detected by pattern integration component 414 are reconciled across time scales, and coherence validation engine 413 ensures temporal dependencies and transitions are preserved. The resulting temporal output reflects a unified temporal narrative, which may include aligned short-term trends, evolving medium-term patterns, and persistent long-term states.

Simultaneously, context input 402 enters context fusion system 420, where context integration processors 421 align data from domain context processor 310, entity context processor 320, and interaction context processor 330. Relationship processing engine 422 reconciles inter-contextual dependencies, and feature combination component 423 merges relevant features, guided by adjustments from context alignment system 424. Contextual weights are calculated and updated by weight adjustment engine 425, prioritizing significant relationships and features identified within the input data. The contextual output reflects a cohesive representation of domain rules, entity relationships, and interaction patterns, structured to align with temporal dynamics.

Both processed outputs are received by cross-scale integration subsystem 430, where integration coordination engine 431 aligns and merges temporal and contextual data. Pattern alignment system 432 ensures compatibility between temporal patterns and contextual relationships, while coherence validation component 433 verifies consistency and logical dependencies across integrated dimensions. State synchronization engine 434 ensures that state information is maintained and updated across the system, using inputs from state management system 500 to align outputs with system-wide state requirements.

The output of fusion system 400 represents a unified, contextually enriched temporal representation that supports downstream systems by providing actionable insights. For example, in an interactive AI system, the output may drive real-time decision-making, adapt recommendations to current user behavior, or provide predictions informed by historical patterns and domain-specific rules. This output may include temporal trends aligned with immediate user interactions, context-specific adjustments for domain constraints or preferences, and predictive insights that reflect long-term consistency. The system's dynamic integration ensures that the output remains coherent and responsive, enabling robust and adaptive performance across a wide range of applications.

Figure 5:
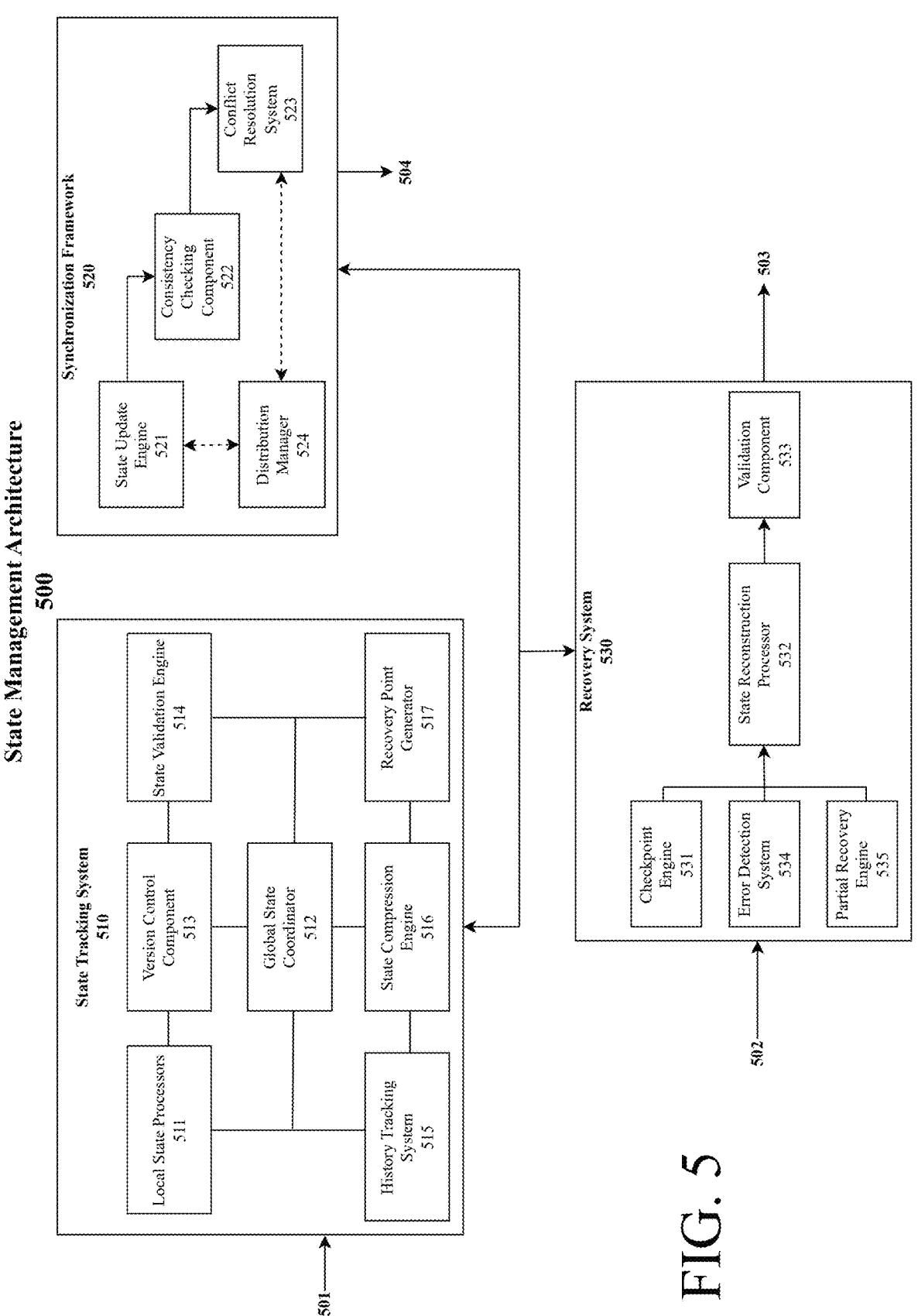
FIG. 5 is a block diagram illustrating exemplary architecture of state management.

FIG. 5 is a block diagram illustrating exemplary architecture of state management 500, in an embodiment. State management 500 coordinates state tracking, synchronization, validation, recovery, and maintenance across various components of the system to ensure temporal coherence and consistency. Data flow begins with state updates 501, which are received from interconnected components of the system, including temporal processing engine 200, context integration engine 300, and fusion engine 400. State management 500 processes these updates to maintain system-wide state integrity.

State tracking system 510 may include local state processors 511 that handle state information for specific subsystems, allowing for localized updates and retrievals. For example, local state processors 511 may track state transitions associated with immediate context data processed by the short-term processor 210 of temporal processing engine 200. In an embodiment, each local state processor may maintain a versioned record of states, enabling rapid access to recent state changes while isolating errors to individual subsystems. Global state coordinator 512 ensures alignment of states across local processors by aggregating and reconciling state data. For instance, global state coordinator 512 may merge local state changes from temporal and context processing components into a unified state representation, which is shared across system components. Version control component 513 tracks incremental changes to states over time, allowing for detailed rollback and reconstruction. In an embodiment, version control component 513 may store checkpoints for every significant state transition, enabling precise reconstruction of states when inconsistencies arise. State validation engine 514 applies predefined rules and conditions to ensure the consistency and integrity of state information. For example, validation may involve cross-referencing updated states with historical patterns stored in pattern repository system 233 of the long-term processor 230. History tracking system 515 records a chronological log of state changes, which may include timestamps, associated patterns, and triggering events, facilitating traceability for debugging and performance analysis. State compression engine 516 optimizes storage by identifying redundant or outdated state data and reducing its resolution or representation while preserving critical information. In an embodiment, this may involve applying compression algorithms, such as wavelet transformations, to long-term state records. Recovery point generator 517 establishes checkpoints at defined intervals or critical operations, supporting state restoration when inconsistencies are detected or recovery is initiated. These checkpoints may include full snapshots of state data or incremental logs that can be reassembled during recovery.

Synchronization framework 520 facilitates state updates and ensures consistency across components. State update engine 521 propagates changes to local and global states, ensuring synchronization among local state processors 511 and global state coordinator 512. For example, state update engine 521 may prioritize updates based on urgency or importance, such as applying real-time adjustments to short-term states during high-frequency data processing. Consistency checking component 522 performs real-time validation by comparing updated states against predefined constraints or expected transitions. In an embodiment, this may involve validating that state transitions conform to dependency rules established by domain context processor 310 in context integration engine 300. Conflict resolution system 523 resolves inconsistencies by applying resolution rules, such as prioritizing recent updates or reconciling conflicting states based on context-specific weights. For instance, in a multi-user environment, conflict resolution system 523 may align user interaction states by reconciling overlapping interactions. Distribution manager 524 coordinates the flow of state updates, ensuring timely propagation across components. This may include managing bandwidth allocation for updates and prioritizing critical components, such as fusion engine 400, to ensure system-wide coherence.

Recovery system 530 addresses restoration and error correction processes, minimizing system disruption during inconsistencies or failures. Checkpoint engine 531 retrieves recovery points generated by recovery point generator 517 and prepares them for reconstruction by state reconstruction processor 532. These recovery points may include full state snapshots or incremental logs, depending on the level of restoration required. State reconstruction processor 532 rebuilds state information from selected recovery points and integrates additional updates to restore consistency. For example, if an inconsistency is detected in medium-term processor 220, state reconstruction processor 532 may apply incremental updates from historical buffer component 221 to recover the correct state. Validation component 533 verifies that reconstructed states meet predefined criteria, such as coherence across temporal scales or alignment with historical trends. In an embodiment, validation may involve running consistency checks against long-term trends identified by trend analysis component 232 of the long-term processor 230. Error detection system 534 continuously monitors state updates for anomalies, such as unexpected transitions or deviations from historical patterns, triggering recovery operations as needed. Partial recovery engine 535 focuses on restoring specific components or subsystems, such as interaction context processor 330, while maintaining overall system functionality. For example, partial recovery may involve isolating and reconstructing the state of a failed subsystem while allowing other components to continue processing uninterrupted.

In an embodiment, machine learning models may be integrated into various components of the system to enhance state tracking, synchronization, validation, and recovery processes. These models may include supervised, unsupervised, or semi-supervised learning approaches, trained to optimize the detection of patterns, validation of state transitions, and reconstruction of inconsistent states. For example, local state processors 511 may implement recurrent neural networks (RNNs) or long short-term memory networks (LSTMs) to model state sequences and predict next states based on historical data. These models may analyze time-series data from short-term, medium-term, and long-term processors to identify trends and anomalies that inform state updates.

Global state coordinator 512 may, in an embodiment, employ graph neural networks (GNNs) to model dependencies between states across subsystems. For example, GNNs may capture relationships between entity-specific states managed by context integration engine 300 and temporal patterns detected by temporal processing engine 200. Training for these models may involve using datasets comprising historical state logs, dependency graphs, and labeled examples of valid state transitions to enable accurate modeling of cross-component dependencies.

State validation engine 514 may incorporate anomaly detection models, such as autoencoders or isolation forests, to identify inconsistencies in state data. For instance, an autoencoder may be trained on state data to learn compact representations of valid states, enabling it to flag deviations indicative of errors or inconsistencies. These models may be trained using historical state records that represent normal operating conditions, augmented with synthetic examples of erroneous states to improve robustness.

State reconstruction processor 532 may, for example, leverage generative models such as variational autoencoders (VAEs) or transformer-based architectures to rebuild inconsistent or missing states. These models may be trained on large datasets containing complete state histories and recovery scenarios, allowing them to generate plausible reconstructions of corrupted or incomplete state data. In an embodiment, the models may include positional encoding to retain temporal information, ensuring that reconstructed states align with the temporal coherence of the system.

Training of these machine learning models may utilize datasets generated from operational logs, including time-stamped state updates, pattern transitions, and recovery scenarios. For example, supervised learning models may be trained using labeled data representing valid and invalid state transitions, while unsupervised learning models may analyze unlabeled data to identify hidden patterns and relationships. In some embodiments, semi-supervised learning techniques may be applied, where a portion of the data is labeled to guide the learning process while leveraging a larger corpus of unlabeled data for additional training.

These models may be updated dynamically through online learning, where new state data continuously informs model parameters, or through periodic retraining using an expanded dataset. For example, the system may periodically aggregate state data from state history tracking system 515 and pattern evolution tracker 235 to refresh training datasets and improve model accuracy. Transfer learning may also be utilized, where pre-trained models from similar applications are fine-tuned on domain-specific data to accelerate deployment and reduce training requirements.

Throughout state management 500, bidirectional communication ensures seamless integration with other components. Local state processors 511 interact directly with state update engine 214 from temporal processing engine 200 and state vector component 322 from context integration engine 300 to track localized state changes. Global state coordinator 512 maintains synchronization with state validation system 415 from fusion engine 400, ensuring system-wide coherence. History tracking system 515 provides temporal insights to pattern evolution tracker 235 in long-term processor 230, enabling informed decision-making during state updates.

Outputs from state management 500 include state updates 504 and recovery operations 503. State updates 504 propagate validated and synchronized state information back to system components, enabling continuity in processing. Recovery operations 503 restore system functionality after detected inconsistencies or errors. This architecture supports robust state tracking and maintenance, ensuring reliable operation across integrated systems.

The data flow through state management 500 begins with state updates 501, which are received from interconnected components, including temporal processing engine 200, context integration engine 300, and fusion engine 400. These updates may originate from subsystems such as state update engine 214 in temporal processing, state vector component 322 in context integration, or state validation system 415 in the fusion engine, each providing localized state changes or adjustments. Local state processors 511 in state tracking system 510 process these updates by storing, modifying, and validating state information specific to their respective subsystems. Global state coordinator 512 aggregates state data from local processors, creating a unified representation that is accessible to other components. History tracking system 515 records each state transition in a chronological log, while version control component 513 tracks incremental changes to states, enabling precise rollback and reconstruction if needed. State compression engine 516 optimizes historical state storage by reducing redundant or outdated data.

Processed state information flows through synchronization framework 520, where state update engine 521 propagates the unified state representation back to all relevant components. Consistency checking component 522 verifies the integrity of synchronized states, identifying and resolving discrepancies through conflict resolution system 523. Distribution manager 524 coordinates the timing and routing of state updates to ensure efficient delivery across subsystems. Recovery system 530 handles state restoration when inconsistencies are detected. Checkpoint engine 531 retrieves recovery points generated by recovery point generator 517, and state reconstruction processor 532 rebuilds the affected state. Validation component 533 ensures the reconstructed state meets predefined criteria before reintegration. The final state updates 504 and recovery operations 503 are sent back to temporal processing engine 200, context integration engine 300, and fusion engine 400, ensuring all components operate with consistent and validated state information. This coordinated data flow maintains temporal coherence, contextual alignment, and system integrity.

When a recovery request 502 is made, it enters recovery system 530 within state management 500, triggering a sequence of operations to restore system consistency and functionality. Recovery requests may originate from error detection systems in components such as state validation engine 514, which monitors for anomalies in state transitions, or from external systems identifying discrepancies that require resolution. Upon receiving a recovery request, checkpoint engine 531 retrieves the most recent recovery point generated by recovery point generator 517. These recovery points may include full state snapshots or incremental logs detailing state changes over time, depending on the system's configuration and the nature of the error.

State reconstruction processor 532 processes the retrieved recovery point by reconstructing the affected state information and integrating it with additional updates from other subsystems. For example, reconstruction may involve applying historical state data from history tracking system 515 and incorporating recent updates from temporal processing engine 200's medium-term processor 220 or context integration engine 300's interaction context processor 330. Validation component 533 then verifies the reconstructed state against predefined criteria, such as temporal coherence, contextual consistency, and compliance with dependency rules established by global state coordinator 512.

If the validation identifies further inconsistencies, partial recovery engine 535 isolates and restores specific subsystems or components, minimizing disruption to overall system operations. For instance, partial recovery may focus on restoring the state of long-term processor 230 while maintaining active processing in short-term and medium-term processors. Once validated, the reconstructed state is reintegrated into the system and distributed through synchronization framework 520, where state update engine 521 propagates the restored state across all relevant subsystems. Consistency checking component 522 ensures that all components, including fusion engine 400 and context integration engine 300, align with the recovered state before the system resumes normal operations. The final recovery operations 503 are sent back to relevant components, completing the process and maintaining system integrity.

Figure 6:
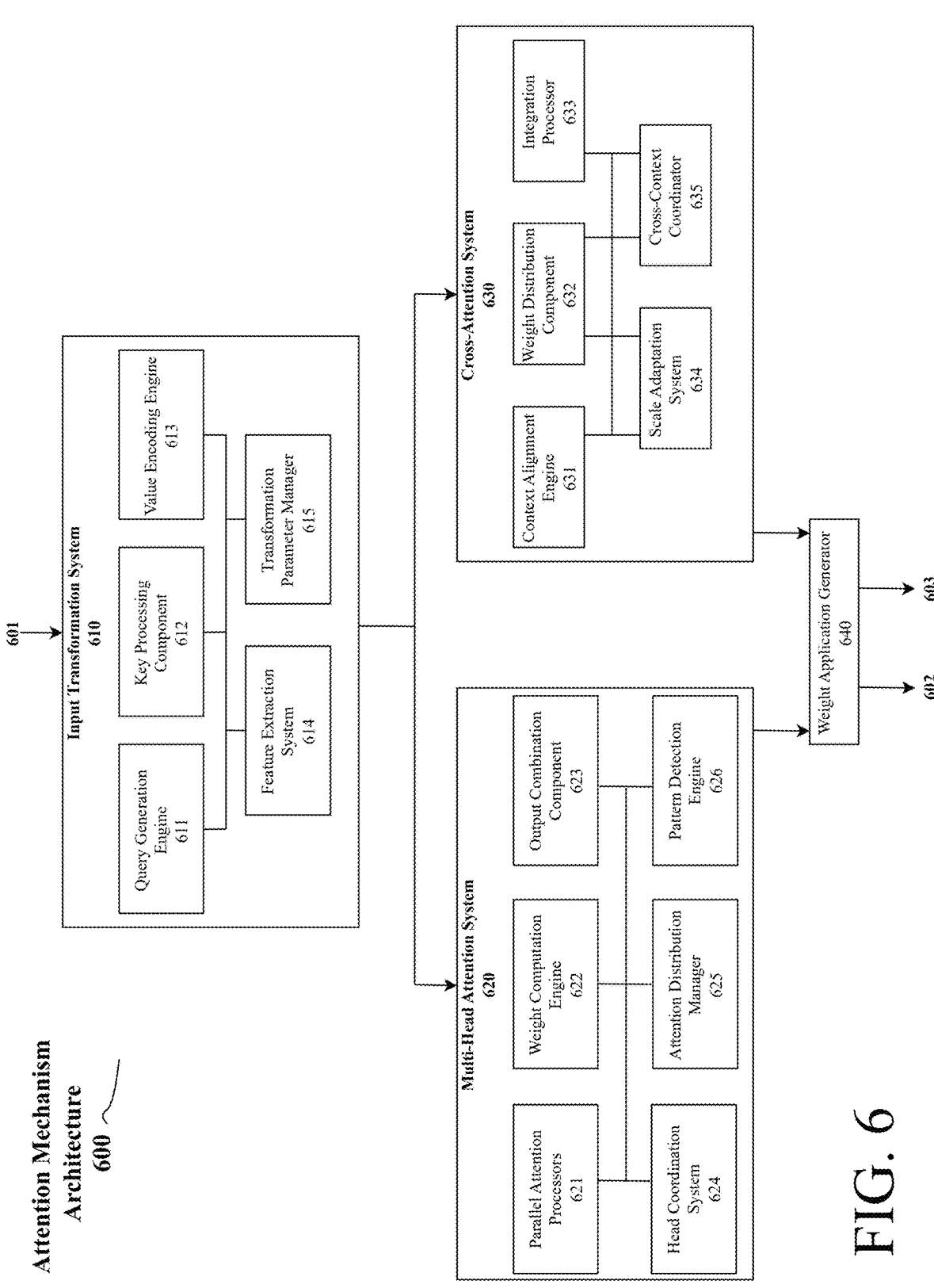
FIG. 6 is a block diagram illustrating exemplary architecture of attention.

FIG. 6 is a block diagram illustrating exemplary architecture of attention mechanism 600, in an embodiment. Attention mechanism 600 facilitates dynamic prioritization and integration of input data by generating and applying weights to emphasize relevant features, contexts, and temporal scales during processing. Data flow begins with input 601, which may include temporal data from temporal processing engine 200 and context data from context integration engine 300. This input is received by input transformation system 610, which processes the data into representations suitable for attention computations.

Input transformation system 610 may include query generation engine 611, kcy processing component 612, and value encoding engine 613, which transform input data into queries, keys, and values that are suitable for attention-based computations. For example, temporal input data from temporal processing engine 200 may be analyzed to extract features representing immediate processing needs, such as real-time events or short-term trends, and these features may be used to generate queries that specify the system's current focus. Context input data from context integration engine 300, such as domain-specific or entity-specific features, may be converted into keys and values that encapsulate relevant stored information, enabling alignment with incoming queries. Feature extraction system 614 processes raw input data to identify salient attributes, which may include patterns, state transitions, or domain-specific signals. For instance, feature extraction may employ signal processing techniques, embedding representations, or natural language processing to ensure critical information is preserved during query, key, and value transformations. Transformation parameter manager 615 governs the parameters of these transformations, dynamically adapting them based on evolving system states and ensuring alignment with components such as pattern recognition engine 331 in context integration engine 300.

Input transformation system 610 may incorporate positional encoding to ensure that temporal and sequential information is preserved during the query, key, and value transformation process. For example, sinusoidal positional encodings may be added to raw input data before it is processed by feature extraction system 614, allowing the system to maintain awareness of temporal ordering and dependencies. These encodings may be particularly valuable when aligning immediate temporal data from temporal processing engine 200 with historical context data from context integration engine 300. Positional encodings may also be applied to intermediate representations within multi-head attention system 620, enabling each attention head to distinguish between data points based on their position in the sequence. In an embodiment, the transformation parameter manager 615 may dynamically adjust the parameters of positional encodings based on the temporal scale of the input, such as applying higher resolution encodings for short-term data and lower resolution encodings for long-term patterns.

Transformed representations flow to multi-head attention system 620, where data is processed across multiple parallel attention heads to capture diverse relationships and dependencies within the input. Parallel attention processors 621 compute attention scores for each head, with each head specializing in analyzing specific aspects of the data, such as immediate temporal relationships or cross-context correlations. Weight computation engine 622 calculates the importance of query-key pairs, dynamically adjusting scores based on relevance and patterns detected in the data. For example, short-term trends may be assigned higher weights during periods of rapid change, while long-term relationships may be emphasized in stable conditions. Output combination component 623 aggregates results from individual heads into a unified attention representation, ensuring that each head's contribution is appropriately integrated. Head coordination system 624 manages dependencies between heads, enabling them to share intermediate results and avoid redundant computations. Attention distribution manager 625 balances processing loads across attention heads, dynamically allocating computational resources based on input complexity and head-specific requirements. Pattern detection engine 626 identifies recurring patterns in attention data, such as consistent query-key alignments or repeating temporal relationships, which may inform downstream processing.

Multi-head attention architecture in multi-head attention system 620 enables the system to process diverse aspects of the input data simultaneously by dividing the data into parallel attention heads. Each attention head specializes in a specific aspect of the input, allowing the system to capture both broad and fine-grained relationships within the data. For example, one attention head may focus on identifying short-term temporal dependencies, such as recurring patterns within immediate data streams processed by short-term processor 210, while another head may concentrate on domain-specific contextual features extracted by domain context processor 310. This parallel architecture ensures that critical relationships across temporal and contextual dimensions are effectively captured and integrated into the unified representation produced by output combination component 623. In an embodiment, the number and configuration of attention heads may be dynamically adjusted based on the complexity and dimensionality of the input data, as determined by attention distribution manager 625.

Weight computation engine 622 may, in an embodiment, dynamically calculate attention weights by analyzing the relationships between queries and keys, considering factors such as relevance metrics, input characteristics, and detected patterns. For example, attention weights may be adjusted to emphasize short-term data when processing real-time temporal events from short-term processor 210 or to prioritize historical trends during strategic analysis. The system may leverage insights from pattern detection engine 626 to identify recurring patterns or anomalies in the data, informing weight adjustments. Additionally, weight computation engine 622 may integrate feedback from other components, such as fusion engine 400, to refine its calculations and ensure alignment with overall system priorities. This dynamic weighting ensures that attention mechanisms adapt to changing data contexts and processing requirements, enhancing the system's responsiveness and accuracy.

Multi-head attention system 620 may, in an embodiment, implement sparse attention mechanisms to optimize computational efficiency and focus processing on the most relevant data. For example, masking techniques may restrict attention computations to specific temporal ranges, such as prioritizing immediate context data from short-term processor 210 while ignoring less relevant long-term patterns during real-time operations. Dropout may also be applied to attention weights to prevent overfitting, particularly when the system processes repetitive or highly correlated data. Attention distribution manager 625 may dynamically determine the scope of attention for each head, ensuring that only significant query-key pairs are processed while reducing unnecessary computations. Sparse attention mechanisms allow the system to allocate resources more efficiently, enhancing overall performance without sacrificing the quality of results.

Cross-attention system 630 integrates data streams from different domains or contexts, aligning queries, keys, and values to enable coherent and unified processing. Context alignment engine 631 matches queries from one data stream, such as temporal inputs, with keys and values from another, such as domain-specific contexts, facilitating integration of diverse information sources. Weight distribution component 632 calculates attention weights for aligned data streams, dynamically prioritizing elements based on relevance and contribution to the overall system objectives. For example, when processing customer interactions, recent activity may be given higher priority than long-term preferences, depending on the context of the task. Integration processor 633 combines aligned data streams into a single representation, ensuring that temporal and contextual elements are seamlessly integrated. Scale adaptation system 634 resolves differences in temporal resolutions or contextual granularities between data streams, applying interpolation, aggregation, or alignment techniques to ensure compatibility. Cross-context coordinator 635 facilitates communication between cross-attention system 630 and other components, such as context integration framework 300, enabling continuous alignment with evolving states and patterns.

Cross-attention system 630 may, in an embodiment, support applications that require the integration of diverse data streams, enabling robust and contextually relevant processing. For example, in a customer service scenario, queries derived from immediate customer interactions processed by short-term processor 210 may be aligned with keys and values representing historical preferences and purchase trends processed by entity context processor 320. This alignment allows the system to generate recommendations that balance short-term behavior with long-term customer profiles. Similarly, in healthcare applications, cross-attention may align real-time vital signs with long-term health records to support timely and contextually informed decision-making. Weight distribution component 632 may dynamically adjust the priority of different data streams, such as emphasizing recent medical events during critical situations or prioritizing long-term trends in routine analyses. By enabling these use cases, cross-attention system 630 facilitates seamless integration of data across temporal and contextual domains, ensuring relevance and coherence in the generated outputs.

Scale adaptation system 634 may, in an embodiment, dynamically adjust data representations to align differing temporal resolutions or contextual granularities across data streams. For example, temporal data from long-term processor 230, which may represent aggregated trends over months, can be interpolated or downsampled to align with high-resolution real-time data from short-term processor 210. Similarly, context data with fine-grained entity relationships processed by entity context processor 320 may be aggregated to match broader domain-specific features from domain context processor 310. Scale adaptation may include techniques such as temporal resampling, feature aggregation, or weighted averaging to reconcile differences without losing critical information. This system ensures that aligned data streams maintain consistency and relevance when processed by integration processor 633 and subsequently passed to weight application generator 640. In an embodiment, scale adaptation system 634 may also adjust processing parameters based on feedback from downstream components, such as fusion engine 400, enabling the system to optimize its integration of multi-scale data.

Both multi-head attention system 620 and cross-attention system 630 provide outputs to weight application generator 640, which applies the computed weights to guide downstream processing. Temporal processing weights 602 influence operations in temporal processing engine 200, such as determining priorities in short-term processor 210 or modifying state transitions in medium-term processor 220 to reflect detected patterns or trends. Context integration weights 603 guide components in context integration engine 300, such as feature extraction engine 314, to emphasize relevant context features or domain adaptation component 315 to adjust processing parameters dynamically. The output of attention mechanism 600 ensures that input data is prioritized and aligned across multiple scales and contexts, facilitating coherent and adaptive system performance.

Weight application generator 640 may, in an embodiment, perform consistency validation on attention results before applying them to downstream components. For example, the generator may cross-reference temporal processing weights 602 with historical state information maintained by state management system 500 to ensure that computed weights align with long-term trends and do not introduce inconsistencies. Context integration weights 603 may similarly be validated against domain-specific constraints processed by domain context processor 310, ensuring adherence to rules or priorities specific to the application domain. The generator may also apply scaling factors to balance the influence of different attention heads or data streams, such as amplifying short-term weights during real-time decision-making scenarios while attenuating less relevant long-term contributions. By integrating these results and validating their consistency, weight application generator 640 ensures that attention mechanism 600 supports coherent and effective processing throughout the system.

Attention mechanism 600 may incorporate error handling procedures to detect and address anomalies in attention computations, ensuring reliable and consistent outputs. For example, pattern detection engine 626 may monitor attention scores for irregularities, such as abnormally high weights assigned to unrelated query-key pairs, and flag these for further analysis. Cross-attention system 630 may include fallback mechanisms, such as using default weights or previously validated outputs, when inconsistencies are detected during alignment or weight distribution. Error signals identified within attention mechanism 600 may be communicated to state management system 500, where recovery system 530 can initiate partial restoration of affected components, such as recalibrating weight computation engine 622 or reprocessing input transformations in input transformation system 610. In an embodiment, consistency validation performed by weight application generator 640 may serve as an additional safeguard, ensuring that errors in upstream attention computations do not propagate to downstream components. These error handling measures enhance the robustness of attention mechanism 600, maintaining system stability even under irregular or unexpected conditions.

Machine learning models may, in an embodiment, be integrated within attention mechanism 600 to enhance the computation of attention weights, pattern detection, and cross-context integration. These models may include supervised, unsupervised, or semi-supervised learning approaches that are trained to optimize query-key-value transformations, detect recurring patterns, and dynamically adjust attention scores. For example, multi-head attention system 620 may incorporate transformer-based architectures, where each head is a scaled dot-product attention mechanism trained to specialize in analyzing specific aspects of input data, such as immediate temporal dependencies or domain-specific features. These models may be trained on large datasets containing labeled sequences of queries, keys, and values, annotated with expected attention weights, to capture relevant relationships across data dimensions.

Cross-attention system 630 may include models such as graph neural networks (GNNs) or attention-based sequence models that align data streams from different domains. For instance, a graph neural network may model relationships between entities identified in context integration engine 300 and temporal patterns detected in temporal processing engine 200. Training for these models may involve datasets containing structured representations of entity interactions, temporal trends, and cross-domain dependencies. These datasets may be constructed from historical interaction logs, annotated knowledge graphs, and synthetic data generated to simulate complex cross-context scenarios. Models in cross-attention system 630 may learn to prioritize certain contexts dynamically, such as emphasizing recent temporal data when immediate responsiveness is required or focusing on historical domain rules for strategic decision-making.

Weight computation engine 622 may leverage deep learning models, such as convolutional neural networks (CNNs) or feed-forward neural networks, to calculate attention scores for each query-key pair. For example, a CNN may analyze patterns in temporal and contextual embeddings to detect correlations that inform weight adjustments. These models may be trained using supervised learning on datasets containing examples of effective query-key alignments and their corresponding weights, with loss functions designed to minimize deviations from expected output distributions.

Pattern detection engine 626 may incorporate recurrent neural networks (RNNs), LSTMs, or temporal convolutional networks (TCNs) to identify recurring patterns within attention data. These models may, for example, detect repeating temporal relationships or persistent cross-context correlations, providing insights to guide attention weight adjustments. Training data for these models may include labeled time-series datasets, where patterns are annotated based on historical trends or known dependencies. Semi-supervised learning techniques may also be employed, where the models leverage both labeled and unlabeled data to improve their ability to generalize across diverse scenarios.

These machine learning models may be updated periodically or continuously to maintain accuracy and relevance. For example, online learning techniques may enable models to adjust their parameters based on real-time feedback from the system, ensuring alignment with evolving patterns in input data. Transfer learning may also be utilized, where pre-trained models from similar applications are fine-tuned on domain-specific data to accelerate deployment and reduce training overhead. Data augmentation techniques may be employed during training to improve model robustness, such as generating synthetic query-key-value pairs or introducing noise to simulate real-world variability.

By integrating machine learning models, attention mechanism 600 may dynamically adapt to changing data conditions, enabling precise and efficient prioritization and alignment of inputs across temporal and contextual dimensions. This integration supports the system's overall objective of maintaining coherence and responsiveness across multiple scales and contexts.

The data flow through attention mechanism 600 begins with input 601, which may include temporal data from temporal processing engine 200 and context data from context integration engine 300. This input is received by input transformation system 610, where query generation engine 611, key processing component 612, and value encoding engine 613 transform the input into queries, keys, and values, guided by feature extraction system 614. Transformation parameter manager 615 ensures that these transformations align with the current processing requirements and state information from other system components. The transformed representations are then processed by multi-head attention system 620, where parallel attention processors 621 calculate attention scores for each head. Weight computation engine 622 determines the importance of query-key relationships, and output combination component 623 aggregates results from all attention heads into a unified representation. Head coordination system 624 ensures efficient communication between attention heads, while attention distribution manager 625 dynamically allocates computational resources. Pattern detection engine 626 identifies recurring or significant relationships within the attention data, which informs downstream processing.

Simultaneously, cross-attention system 630 aligns data streams from different domains or contexts. Context alignment engine 631 matches queries from one stream with keys and values from another, weight distribution component 632 computes attention weights for aligned data, and integration processor 633 combines the streams into a coherent representation. Scale adaptation system 634 resolves differences in resolution or granularity between streams, and cross-context coordinator 635 facilitates synchronization with other system components. Both multi-head attention system 620 and cross-attention system 630 feed their outputs into weight application generator 640, which generates temporal processing weights 602 and context integration weights 603. These weights are sent to temporal processing engine 200 and context integration engine 300, respectively, influencing operations such as prioritization of temporal data in short-term processor 210 and feature extraction in context integration framework 300. This flow enables attention mechanism 600 to dynamically prioritize and align input data across temporal and contextual dimensions, ensuring coherent and adaptive processing throughout the system.

FIG. 7 is a method diagram illustrating the overall processing of multi-scale temporal context integration system 100, in an embodiment. Input data 101 is received by processing coordinator 120, where the data undergoes initial validation to ensure conformity with required formats and preprocessing to normalize and standardize features for downstream components. Preprocessing may include timestamp alignment, feature scaling, and schema verification to ensure consistency across temporal and contextual data streams 701. Relevant features are then extracted from input data by feature extraction systems in temporal processing engine 200 and context integration engine 300. Temporal feature extraction may involve identifying time-based trends and events, while context-specific extraction focuses on attributes such as domain-specific rules or entity relationships. These features are organized into representations suitable for further processing 702.

Temporal analysis is performed by short-term processor 210, medium-term processor 220, and long-term processor 230 within temporal processing engine 200. Each processor operates at a distinct time scale, analyzing immediate, recent, and extended historical data to detect patterns, state transitions, and trends specific to its time scale. For example, short-term processor 210 may identify high-frequency patterns within a rolling time window, while long-term processor 230 analyzes aggregated historical trends over months 703. Simultaneously, context integration engine 300 processes input data to extract domain-specific, entity-specific, and interaction-specific context features. Domain context processor 310 applies rules and knowledge graphs to analyze structured data, entity context processor 320 identifies and tracks relationships between entities, and interaction context processor 330 examines interaction histories and dependencies to generate a unified contextual representation 704.

State management system 500 tracks and maintains state information across the system, ensuring synchronization and validation of states from temporal processing engine 200, context integration engine 300, and fusion engine 400. Local state processors manage component-specific states, while the global state coordinator aggregates and reconciles these states into a unified representation. This process ensures temporal coherence and consistency across all components 705. Fusion engine 400 receives outputs from temporal processing engine 200 and context integration engine 300, integrating temporal and contextual data into a coherent, unified representation. This process dynamically assigns weights to different scales and contexts, aligning short-term, medium-term, and long-term patterns with domain and entity-specific contexts to generate a comprehensive output 706.

Output data 102 is generated by fusion engine 400 and formatted for delivery to downstream components or external systems. Formatting may include transforming the data into structured responses, reports, or visualizations depending on application requirements 707. Validation and feedback mechanisms verify the consistency and coherence of generated outputs, identifying anomalies or discrepancies. When inconsistencies are detected, state management system 500 performs corrections by initiating recovery processes or recalibrating system parameters 708. Feedback loops adjust processing parameters in temporal processing engine 200 and context integration engine 300, enabling adaptive optimization of future operations based on system performance metrics and identified patterns 709.

FIG. 8 is a method diagram illustrating the temporal processing of multi-scale temporal context integration system 100, in an embodiment. Input data 201 is initially distributed to the system's temporal processors by input distribution component 205. This component separates the data into distinct temporal scales, ensuring that immediate data is directed to short-term processor 210, recent historical data to medium-term processor 220, and extended historical data to long-term processor 230, thereby preparing the data for parallel processing 801.

Each temporal processor then processes the data in parallel to extract time-specific patterns and dependencies. Short-term processor 210 handles real-time data, analyzing immediate trends and state changes. Medium-term processor 220 focuses on intermediate patterns, integrating data from recent interactions to identify evolving trends. Long-term processor 230 evaluates extended historical data to detect persistent patterns or seasonal trends, leveraging techniques such as trend analysis and hierarchical compression 802.

Pattern detection is performed within each processor to identify significant events or correlations in the data. Pattern detection engine 213 in short-term processor 210 identifies transient patterns, such as spikes or anomalies in real-time data. Pattern evolution tracker 222 in medium-term processor 220 analyzes how patterns develop or change over recent timeframes. Trend analysis component 232 in long-term processor 230 evaluates persistent trends across extensive historical datasets, ensuring comprehensive pattern recognition across temporal horizons 803.

State tracking is conducted concurrently in each processor. Immediate state tracker 212 manages transient states within short-term processor 210, ensuring real-time responsiveness. State transition engine 223 in medium-term processor 220 updates states to reflect intermediate changes detected in recent data. Historical state archive 234 in long-term processor 230 maintains durable records of long-term states, preserving consistency and enabling integration with other time scales 804.

The outputs from each temporal processor are routed to cross-scale components 240, where state synchronization mechanism 241 reconciles and aligns state information across temporal scales. This process ensures that outputs from short-term, medium-term, and long-term processors are coherent and consistent, allowing for seamless integration across time horizons 805.

Pattern correlation engine 242 integrates the patterns detected across all temporal processors. By identifying correlations between short-term trends, medium-term developments, and long-term patterns, the system generates a unified representation of temporal dependencies, providing a comprehensive view of temporal relationships 806.

Temporal coherence validator 243 verifies the consistency of the integrated data. This subsystem cross-references the integrated outputs with system-wide state information maintained by state management system 500, ensuring that all temporal relationships align with the current and historical states of the system 807.

Scale transition manager 244 refines the integration of data across temporal scales by making necessary adjustments to state transitions or outputs. For example, it may reconcile discrepancies between high-resolution short-term data and lower-resolution long-term trends, ensuring smooth alignment across scales 808.

The final integrated temporal outputs are delivered to fusion engine 400. These outputs, representing a unified and coherent analysis of temporal data, are then combined with context data for further processing and decision-making 809.

FIG. 9 is a method diagram illustrating the context integration of multi-scale temporal context integration system 100, in an embodiment. Input data 301 is received by context distribution subsystem 305, which identifies relevant portions of the data and routes it to domain context processor 310, entity context processor 320, and interaction context processor 330. This ensures that each processor focuses on data specific to its context type, optimizing the processing flow and resource allocation 901. Context feature extraction is performed by feature extraction engine 314 within domain context processor 310, where domain-relevant features such as regulatory constraints or operational rules are identified. Simultaneously, entity identification system 323 within entity context processor 320 extracts entity-specific attributes such as names, identifiers, or tags, while interaction history system 333 within interaction context processor 330 analyzes temporal and relational aspects of previous interactions 902.

Domain processing occurs within domain context processor 310, where knowledge graph engine 311 maps extracted features to structured domain knowledge, enabling the system to interpret and utilize domain-specific hierarchies, relationships, and ontologies. Rule processing system 312 applies domain-specific rules, such as compliance checks or industry standards, to refine the contextual understanding and enhance consistency in domain representations 903. Entity analysis is conducted by entity context processor 320, where entity relationship engine 321 identifies connections between entities, such as customer-to-product or machine-to-environment relationships. State vector component 322 tracks the current status of each entity, including dynamic attributes such as preferences, operational metrics, or recent interactions, ensuring a comprehensive and up-to-date representation of each entity 904.

Interaction pattern recognition is performed by interaction context processor 330, where pattern recognition engine 331 detects recurring interaction patterns, such as repeated customer inquiries or cyclic operational events. Temporal dependency tracker 332 analyzes sequential dependencies between events, identifying causal relationships or trends over time that can inform downstream decision-making 905. Context fusion operations are handled by context integration subsystem 340, which reconciles outputs from the three processors into a unified representation. This process resolves inconsistencies between domain, entity, and interaction contexts, ensuring alignment and coherence across the integrated data streams 906.

State synchronization is performed by state management system 500, where updates from context integration subsystem 340 are validated and incorporated into the global state representation. This step ensures that context-related updates are synchronized across all system components, maintaining consistency and temporal coherence 907. The unified context representation is then forwarded to fusion engine 400, where it is integrated with temporal outputs from temporal processing engine 200. This combination supports the generation of coherent system outputs that reflect both temporal and contextual dimensions of the input data 908.

FIG. 10 is a method diagram illustrating the state management of multi-scale temporal context integration system 100, in an embodiment. State initialization is performed by local state processors 511 and global state coordinator 512, where initial states are established based on input data and predefined configurations. These initial states may include baseline representations of temporal patterns from temporal processing engine 200 and context-specific attributes from context integration engine 300, ensuring that all system components begin with a coherent and synchronized state foundation 1001. State updates are received from various system components, reflecting recent changes and transitions, and are processed by state update engine 521. For example, updates may include changes in temporal trends detected by medium-term processor 220 or adjustments to context-specific states maintained by entity context processor 320 1002.

Consistency checking is conducted by consistency checking component 522, which validates state updates against predefined rules, historical data, and cross-component dependencies. This process may involve comparing state transitions to historical trends recorded in historical state archive 234 or verifying alignment with domain-specific constraints from domain context processor 310. Any inconsistencies are flagged for further resolution 1003. Version control is managed by version control component 513, which tracks all state changes over time and creates a versioned history. These versions allow the system to perform rollback operations, audit state changes, or compare current states against past configurations for debugging or optimization 1004.

State synchronization is performed by synchronization framework 520, where global state coordinator 512 aligns local states from multiple components into a unified system-wide representation. This alignment ensures that updates from subsystems such as pattern evolution tracker 222 and state vector component 322 are reflected consistently across the system, maintaining temporal and contextual coherence 1005. Conflict resolution is handled by conflict resolution system 523, which resolves inconsistencies or competing state updates using predefined rules or contextual priorities. For example, in cases where updates from short-term processor 210 conflict with long-term trends identified by trend analysis component 232, priority may be given to the most contextually relevant state 1006.

Recovery points are generated by recovery point generator 517 at regular intervals or critical operations, creating snapshots of system states that can be used for restoration in case of anomalies. These recovery points may include comprehensive state snapshots or incremental updates, depending on the system's operational requirements 1007. Recovery operations are executed by recovery system 530, where checkpoint engine 531 retrieves saved states, and state reconstruction processor 532 restores the system to a valid configuration. For example, state reconstruction may involve replaying incremental updates stored in version control component 513 or applying corrections to specific subsystems identified by error detection system 534 1008.

Updated states are validated and synchronized across system components by distribution manager 524, ensuring that all subsystems, including fusion engine 400, operate with consistent and validated state information. This final synchronization step guarantees continuity and prepares the system for subsequent operations, maintaining reliability across multi-scale temporal and contextual processes 1009.

FIG. 11 is a method diagram illustrating the error recovery of multi-scale temporal context integration system 100, in an embodiment. Errors are detected by error detection system 534, which continuously monitors inputs, outputs, and intermediate states for anomalies, inconsistencies, or unexpected patterns. For example, anomalies may include deviations from expected temporal patterns in short-term processor 210 or inconsistencies in context relationships within entity context processor 320, and these are flagged for further assessment 1101. Impact assessment is performed by validation component 533, evaluating the scope and severity of detected errors. This process may identify specific components or subsystems affected by the error and assess their dependencies, such as determining whether an inconsistency in fusion engine 400 affects outputs dependent on state transitions from temporal processing engine 200 1102.

Containment measures are implemented by conflict resolution system 523 and recovery system 530 to isolate affected components and prevent error propagation throughout the system. For example, containment may involve temporarily suspending operations in affected processors, such as interaction context processor 330, while allowing unaffected components to continue processing 1103. State recovery operations are initiated by checkpoint engine 531, which retrieves recovery points generated by recovery point generator 517. These recovery points may include full snapshots or incremental updates, ensuring the system can revert affected states to a known valid configuration without disrupting unrelated processes 1104.

State reconstruction processor 532 processes retrieved recovery points, applying updates or adjustments as needed to restore consistency. For example, if an error occurs in medium-term processor 220, state reconstruction may involve replaying incremental updates stored in historical buffer component 221 to re-establish coherence across time scales 1105. Processing restoration is managed by synchronization framework 520, which reinitializes affected processes and resumes suspended operations. This step may include coordinating temporal and contextual data flows between subsystems, such as reactivating fusion operations in fusion engine 400 to align restored states with ongoing system outputs 1106.

Validation operations are conducted by consistency checking component 522, verifying that restored states and processes meet predefined integrity and coherence criteria. This validation may involve cross-referencing restored states with historical trends in pattern repository system 233 and ensuring alignment with global state information maintained by state management system 500 1107. Adjustments to recovery parameters and system configurations are performed by state management system 500 to optimize future recovery operations and reduce the likelihood of similar errors recurring. For example, adjustments may involve refining checkpoint intervals or updating error detection thresholds to improve system resilience 1108. Finally, system operations are resumed, with validated states and processes reintegrated into the overall workflow. This ensures continuity and stability across all components, maintaining the system's operational integrity and coherence 1109.

FIG. 12 is a method diagram illustrating the adaptation of multi-scale temporal context integration system 100, in an embodiment. System performance is monitored by resource management component 130, which collects metrics such as processing speed, resource utilization, and system latency from all major components, including temporal processing engine 200 and context integration engine 300. These metrics provide real-time insights into the operational efficiency and potential bottlenecks within the system, serving as the foundation for subsequent adaptation steps 1201. Pattern analysis is conducted by pattern detection engine 213 in temporal processing engine 200 and pattern recognition engine 331 in context integration engine 300, identifying trends, anomalies, and recurring patterns. For example, short-term processor 210 may detect rapid changes in temporal data, while interaction context processor 330 may identify shifts in user behavior or interaction patterns 1202.

Weight adjustments are dynamically calculated by weight computation engine 622 in multi-head attention system 620 and weight distribution component 632 in cross-attention system 630. These adjustments may prioritize certain temporal scales or context types based on detected patterns, such as increasing the weight assigned to short-term data during real-time operations or amplifying the influence of historical trends during strategic analyses 1203. Processing parameters are updated by transformation parameter manager 615 in input transformation system 610 and domain adaptation component 315 in domain context processor 310. These updates may reflect changes in input characteristics, such as variations in data frequency or domain-specific rules, ensuring that the system remains responsive to evolving conditions 1204.

Validation is performed by consistency checking component 522 and validation component 533, ensuring that adjusted weights and parameters align with predefined rules and do not introduce inconsistencies. For example, validation may involve cross-referencing new weights with historical states recorded by state management system 500 or verifying that parameter updates preserve coherence across temporal scales and context types 1205. Feedback is integrated into state management system 500, where validated adjustments are stored in state trackers and propagated to subsystems. This integration ensures that updates are synchronized across the system, maintaining alignment with global states and enhancing overall coherence 1206.

The validated updates are applied to temporal processing engine 200 and context integration engine 300, where adjusted weights and parameters refine the operation of processors. For instance, state transitions in medium-term processor 220 may be recalibrated to align with updated priorities, while feature extraction in domain context processor 310 may be adjusted to emphasize newly detected trends 1207. Adaptive improvements are validated in downstream outputs generated by fusion engine 400, ensuring that refined operations enhance overall system performance while maintaining coherence and alignment with prior states 1208. Continuous monitoring is resumed by resource management component 130, initiating subsequent adaptation cycles as necessary to sustain optimal performance across all components of the system 1209.

In a non-limiting use case example of multi-scale temporal context integration system 100, the system is implemented to optimize customer interactions in a restaurant's front-of-house operations. Input data 101 includes real-time updates such as customer arrivals, table occupancy statuses, and waitlist information, which are processed by temporal processing engine 200. Short-term processor 210 analyzes immediate data, such as the current number of parties waiting and their respective preferences for seating arrangements. Medium-term processor 220 evaluates recent patterns, such as the average party size and wait times over the past week, to predict peak periods and guide staff allocations. Long-term processor 230 considers broader historical trends, such as seasonal variations in customer traffic or holiday surges, to inform strategic planning.

Context integration engine 300 combines this temporal data with contextual information specific to the restaurant. Domain context processor 310 applies restaurant policies, such as rules for seating priority (e.g., large parties are seated at designated tables) and dining time limits during peak hours. Entity context processor 320 tracks information on individual customers, including VIP designations, preferences for specific tables, and past orders. Interaction context processor 330 monitors ongoing interactions, such as communication between hosts and customers or updates to the waitlist, ensuring real-time coordination. These processors work together to build a comprehensive understanding of the current state of operations and customer needs.

Fusion engine 400 integrates the outputs of temporal processing engine 200 and context integration engine 300 to dynamically generate actionable insights. For instance, the system may recommend seating arrangements that maximize table utilization while prioritizing customers with specific requests or VIP status. It may also provide estimated wait times for incoming customers based on historical and real-time data, enabling hosts to communicate accurately and manage expectations. Additionally, the system can identify opportunities to seat walk-ins efficiently during lulls or accommodate special occasions such as birthdays.

State management system 500 maintains consistency across all components, ensuring that updates from temporal and context processing are synchronized. For example, changes to the waitlist tracked by interaction context processor 330 are propagated to state management system 500, which ensures that seating recommendations generated by fusion engine 400 remain accurate and up-to-date. State recovery mechanisms, such as checkpoints created by recovery point generator 517, ensure that errors, such as incorrect customer preferences or delays in data processing, can be corrected without disrupting overall operations.

In this use case, the system enables staff to deliver a seamless and personalized dining experience. Hosts are equipped with real-time insights to reduce wait times and handle complex seating arrangements, while customers benefit from improved service efficiency and satisfaction. The restaurant also gains valuable data for long-term planning, such as identifying peak periods for staffing adjustments or tailoring promotions to customer preferences. This demonstrates the versatility and effectiveness of multi-scale temporal context integration system 100 in managing dynamic and customer-centric environments.

In another non-limiting use case example of multi-scale temporal context integration system 100, the system supports back-of-house operations in a restaurant by optimizing inventory management and kitchen workflow. Input data 101 includes real-time information such as ingredient usage rates, order tickets, and staff availability, which is processed by temporal processing engine 200. Short-term processor 210 analyzes immediate data, such as the current rate of ingredient consumption during ongoing meal preparation, enabling rapid adjustments to supply levels or order sequencing. Medium-term processor 220 evaluates patterns from recent shifts, such as the frequency of specific dishes ordered over the past week, to identify trends that inform prep levels and restocking schedules. Long-term processor 230 considers broader trends, such as seasonal changes in menu popularity or historical supplier delivery times, ensuring the system anticipates recurring demands and prepares accordingly.

Context integration engine 300 combines this temporal data with contextual knowledge relevant to back-of-house operations. Domain context processor 310 applies rules such as food safety standards, storage requirements, and inventory turnover policies. For instance, it may prioritize the use of perishable items nearing expiration to minimize waste while maintaining compliance with health regulations. Entity context processor 320 tracks supplier relationships and delivery schedules, enabling dynamic adjustments to reorder plans in case of delays or shortages. Interaction context processor 330 monitors coordination among kitchen staff, such as updates to dish preparation status or workflow interruptions caused by equipment malfunctions. This comprehensive context enables the system to understand the intricate dynamics of kitchen and inventory operations.

Fusion engine 400 integrates outputs from temporal processing engine 200 and context integration engine 300 to generate actionable recommendations for staff. For example, the system may identify an upcoming shortage of a critical ingredient based on real-time consumption and recent order patterns, prompting an alert to reorder supplies from a preferred vendor tracked by entity context processor 320. It may also provide recommendations for reallocating resources during busy periods, such as prioritizing certain prep stations or temporarily modifying dish assembly workflows to manage bottlenecks.

State management system 500 ensures consistency and synchronization across all subsystems. Updates to ingredient usage rates tracked by short-term processor 210 are validated and incorporated into the global state, ensuring that inventory levels remain accurate and reliable. Recovery mechanisms, such as checkpoints created by recovery point generator 517, provide resilience in case of discrepancies, such as mismatched order tickets or missing inventory data. State synchronization ensures that all adjustments, from inventory changes to kitchen workflows, are coordinated seamlessly across the system.

This use case highlights how multi-scale temporal context integration system 100 enhances the efficiency and reliability of back-of-house operations. By integrating temporal data and contextual knowledge, the system minimizes waste, optimizes resource allocation, and ensures that kitchen staff can respond to changing demands effectively. These capabilities enable the restaurant to maintain high operational standards, reduce costs, and deliver consistent quality to customers.

In another non-limiting use case example of multi-scale temporal context integration system 100, the system is applied in a healthcare setting to monitor patient health and provide actionable insights for caregivers. Input data 101 includes real-time vital signs such as heart rate, blood pressure, and oxygen levels, as well as patient activity data collected through wearable devices. Temporal processing engine 200 analyzes this data at multiple time scales. Short-term processor 210 monitors immediate fluctuations in vitals, detecting anomalies such as sudden drops in oxygen saturation. Medium-term processor 220 evaluates trends over recent days or weeks, such as changes in blood pressure patterns, while long-term processor 230 incorporates historical health records to identify persistent conditions or risk factors.

Context integration engine 300 combines this temporal analysis with patient-specific and domain-specific contextual data. Entity context processor 320 manages patient profiles, including demographic details, medical histories, and current medications. Domain context processor 310 applies medical protocols, such as treatment guidelines for chronic conditions or thresholds for triggering alerts in critical care situations. Interaction context processor 330 tracks recent interactions between patients and healthcare providers, such as consultations, medication changes, or reported symptoms, ensuring that care recommendations are informed by recent clinical events.

Fusion engine 400 integrates these outputs to generate personalized health insights and actionable recommendations. For example, the system may alert a caregiver to administer an intervention if a patient's vitals exceed critical thresholds, using a combination of real-time monitoring and historical trend analysis. It may also recommend adjustments to treatment plans, such as modifying medication dosages based on the evolution of a patient's condition or scheduling follow-up visits for further evaluation.

State management system 500 ensures consistency across temporal and contextual updates, synchronizing patient data to maintain an accurate and unified health profile. For instance, when a caregiver updates a patient's treatment plan, the changes are propagated across all system components, ensuring that subsequent recommendations align with the latest data. Recovery mechanisms, such as checkpoint engine 531, allow the system to restore prior states in case of errors, such as erroneous data entries or equipment malfunctions.

In this use case, multi-scale temporal context integration system 100 supports caregivers in delivering timely, personalized, and effective healthcare. The integration of temporal and contextual data enables proactive interventions, improved patient outcomes, and optimized resource allocation in medical environments. This example highlights the system's adaptability to complex, high-stakes applications where precision and responsiveness are critical.

In a non-limiting use case example of multi-scale temporal context integration system 100, the system is applied in a hotel management setting to optimize operations, predict periods of high demand, and enhance guest experiences. Input data 101 includes real-time updates such as room availability, active reservations, and guest check-ins, processed by temporal processing engine 200. Short-term processor 210 analyzes immediate data, such as the current rate of new bookings or cancellations. Medium-term processor 220 evaluates trends from recent weeks, such as peak days for check-ins or seasonal occupancy rates, while long-term processor 230 incorporates historical data, including year-over-year booking patterns and the impact of previous local events on hotel demand.

Context integration engine 300 processes this temporal data alongside contextual information relevant to hotel management. Entity context processor 320 tracks individual guest preferences, such as room types, amenities, and loyalty program status, enabling personalized service. Domain context processor 310 incorporates hotel policies, such as rules for prioritizing high-value guests or handling overbooked situations. Interaction context processor 330 monitors ongoing interactions, such as guest requests for early check-ins or special accommodations, ensuring that real-time guest needs are accounted for in operational decisions.

The system is further enhanced by its ability to monitor regional events, incorporating external data sources such as event calendars, weather forecasts, and transportation schedules. For example, domain context processor 310 may integrate information about a major concert, conference, or festival occurring nearby, while interaction context processor 330 tracks inquiries from potential guests mentioning attendance at these events. Temporal processing engine 200 evaluates the timing and expected duration of such events, combining them with historical demand data to predict surges in bookings.

Fusion engine 400 integrates all these inputs to provide actionable insights and recommendations. For instance, the system may dynamically adjust room pricing based on predicted demand spikes, offer targeted promotions to guests with relevant booking histories, or recommend staff schedule adjustments to accommodate increased check-in activity. The system can also generate alerts to ensure that critical resources, such as housekeeping or concierge services, are adequately allocated during high-demand periods.

State management system 500 ensures consistency across temporal and contextual updates, synchronizing changes in room availability, pricing, and staff schedules. For example, when a last-minute cancellation is received, the system updates the availability state across all components and adjusts demand predictions accordingly. Recovery mechanisms, such as checkpoint engine 531, allow the system to restore accurate states in the event of data errors or system interruptions, ensuring operational continuity during peak periods.

In this use case, multi-scale temporal context integration system 100 empowers hotel managers to anticipate and respond to fluctuations in demand, providing guests with seamless and personalized experiences while optimizing operational efficiency. By integrating real-time, contextual, and external event data, the system enables the hotel to remain agile in a dynamic environment, ensuring competitive advantage and guest satisfaction.

In a non-limiting use case example of multi-scale temporal context integration system 100, the system is integrated into a dining application to provide personalized recommendations and enhance user engagement. Input data 101 includes real-time user activity, such as searches for restaurants, interactions with menus, and reservation requests. This data is processed by temporal processing engine 200, where short-term processor 210 analyzes immediate user behavior, such as the cuisine types or price ranges being browsed. Medium-term processor 220 evaluates trends in recent user activity, such as the frequency of dining out or preferences for specific days or times. Long-term processor 230 incorporates historical data, such as a user's dining history, favorite cuisines, and reviews left on prior visits.

Context integration engine 300 processes this temporal data alongside user-specific and domain-specific contextual information. Entity context processor 320 maintains a profile for the user, including preferences for specific dishes, dietary restrictions, and loyalty memberships with certain restaurants. Domain context processor 310 applies rules related to restaurant operations, such as availability of table types, reservation policies, or special offers. Interaction context processor 330 monitors ongoing interactions within the application, such as whether the user is actively browsing for same-day reservations or planning ahead for an event.

Fusion engine 400 integrates these outputs to generate personalized recommendations and insights. For example, the system may suggest restaurants that match the user's current preferences based on real-time activity, such as browsing a specific cuisine category. It may also prioritize restaurants offering discounts or promotions that align with the user's loyalty memberships or past spending habits. Additionally, the system can predict the user's future dining needs by analyzing long-term patterns, such as recommending brunch spots if the user has consistently shown a preference for morning reservations on weekends.

State management system 500 ensures consistency and accuracy across temporal and contextual updates. For example, when the user makes a reservation, the system updates the availability state for the selected restaurant and reflects the booking in the user's profile and the application's recommendation algorithms. Recovery mechanisms, such as checkpoint engine 531, enable the system to restore user preferences or reservations in the event of accidental cancellations or errors during the booking process.

In this use case, multi-scale temporal context integration system 100 provides a highly personalized and seamless dining application experience. Users receive recommendations tailored to their tastes and habits, while restaurants benefit from increased visibility and targeted engagement. By integrating temporal analysis and contextual data, the system enhances decision-making for both users and dining establishments, driving satisfaction and loyalty.

The use case examples described herein are intended to be non-limiting and are provided for illustrative purposes only to demonstrate the versatility and functionality of multi-scale temporal context integration system 100. The range of potential applications for the system is vast and spans diverse fields such as hospitality, healthcare, customer service, retail, and more. Embodiments of the system may vary significantly depending on the specific requirements and contexts of the application, as one skilled in the art would readily recognize. Variations may include modifications to the architecture, configurations of subsystems, and implementation details, all of which can be tailored to optimize performance and meet the unique demands of a given use case without departing from the scope and spirit of the invention.

Exemplary Computing Environment

Figure 13:
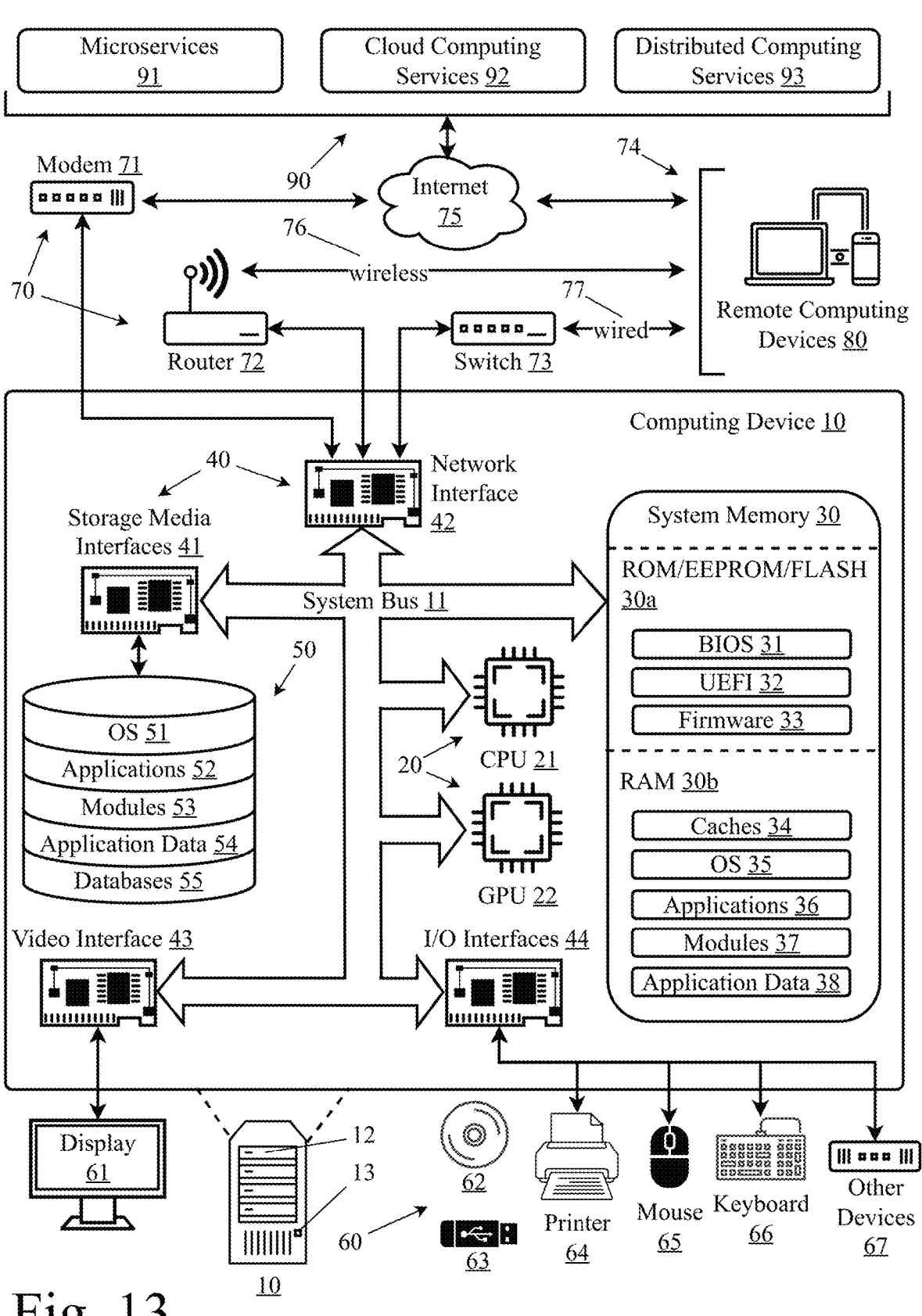
FIG. 13 illustrates an exemplary computing environment on which an embodiment described herein may be implemented.

FIG. 13 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth.

Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random-access memory (RAM), and is normally the primary operating memory into which the operating system

35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, low latency, and cost-effectiveness, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities and lower cost per gigabyte. NAND flash memory comes in different types, such as Single-Level Cell (SLC), Multi-Level Cell (MLC), Triple-Level Cell (TLC), and Quad-Level Cell (QLC), each with trade-offs between performance, endurance, and cost. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as cost, performance, and availability. For example, Terraform can be used to automatically provision and scale resources on AWS spot instances during periods of high demand, such as for surge rendering tasks, to take advantage of lower costs while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a containerfile or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Containerd provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance or uncertainty over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computer system comprising:
   a hardware memory, wherein the computer system is configured to execute software instructions stored on nontransitory machine-readable storage media that implement:
   a temporal processing engine configured to:
   receive input data comprising immediate context data and historical context data;
   process the input data in parallel at multiple time scales using a plurality of temporal processors, wherein each temporal processor operates at a different time scale, and wherein the plurality of temporal processors comprises a short-term processor configured to process immediate context data, a medium-term processor configured to process recent historical data, and a long-term processor configured to process extended historical data, each processor maintaining processor-specific state information;
   maintain temporal coherence between the plurality of temporal processors by synchronizing the processor-specific state information across the multiple time scales;
   identify patterns across the multiple time scales and generate pattern information by correlating the patterns detected at the multiple time scales using the processor-specific state information; and
   a context integration engine configured to:
   extract context features from the input data;
   generate context representations from the context features for different context types; and
   maintain state information across the different context types concurrently and independently with respect to the plurality of temporal processors;
   a fusion engine configured to:
   combine a plurality of temporal outputs from the plurality of temporal processors into a unified temporal output;
   integrate the unified temporal output with the context representations to produce integrated temporal and context information by implementing sequential fusion layers;
   validate the consistency of the integrated temporal and context information; and
   generate a coherent output based on the integrated temporal and context information.

2. The computer system of claim 1, wherein each temporal processor implements pattern identification and state tracking specific to its respective time scale while maintaining state information within that time scale.

3. The computer system of claim 1, wherein the computer system is further configured to process domain-specific information through domain context, entity relationships through entity context, and interaction patterns through interaction context.

4. The computer system of claim 1, wherein the computer system is further configured to dynamically assign and adjust weights to the multiple temporal scales based on the identified patterns within the input data to generate the coherent output.

5. The computer system of claim 1, wherein maintaining temporal coherence comprises identifying and reconciling temporal dependencies while tracking state transitions between the multiple time scales.

6. The computer system of claim 1, wherein the context integration engine maintains consistency between the context representations while tracking relationships and state changes across the different context types.

7. The computer system of claim 1, wherein the computer system is further configured to maintain consistent state information and track state transitions across the multiple time scales during temporal processing.

8. The computer system of claim 1, wherein the computer system is further configured to identify and track pattern evolution across the multiple time scales while integrating the pattern information into the context representations.

9. The computer system of claim 1, wherein the computer system is further configured to implement sequential fusion layers for temporal information, context types, and cross-integration of temporal and context information.

10. The computer system of claim 1, wherein the computer system is further configured to adjust processing parameters and update the context representations based on identified pattern changes across the multiple time scales.

11. The computer system of claim 1, wherein the computer system is further configured to validate temporal, context, and state consistency throughout the integration process when generating the coherent output.

12. A computer-implemented method comprising the steps of:

receiving input data comprising immediate context data and historical context data;

processing the input data in parallel at multiple time scales using a plurality of temporal processors, wherein each temporal processor operates at a different time scale, and wherein the plurality of temporal processors comprises a short-term processor configured to process immediate context data, a medium-term processor configured to process recent historical data, and a long-term processor configured to process extended historical data, each processor maintaining processor-specific state information;

maintaining temporal coherence between the plurality of temporal processors by synchronizing the processor-specific state information across the multiple time scales;

identifying patterns across the multiple time scales and generate pattern information by correlating the patterns detected at the multiple time scales using the processor-specific state information;

extracting context features from the input data;

generating context representations from the context features for different context types;

maintaining state information across the different context types concurrently and independently with respect to the plurality of temporal processors;

combining a plurality of temporal outputs from the plurality of temporal processors into a unified temporal output;

integrating the unified temporal output with the context representations to produce integrated temporal and context information by implementing sequential fusion layers;

validating consistency of the integrated temporal and context information; and generating a coherent output based on the integrated temporal and context information.

13. The method of claim 12, wherein processing at each time scale comprises identifying patterns and tracking state transitions specific to the respective time scale while maintaining corresponding state information.

14. The method of claim 12, wherein generating context representations comprises processing domain-specific information as domain context, entity relationships as entity context, and interaction patterns as interaction context.

15. The method of claim 12, wherein combining the plurality of temporal outputs comprises dynamically assigning and adjusting weights to the multiple temporal scales based on the identified patterns within the input data.

16. The method of claim 12, wherein maintaining temporal coherence comprises identifying and reconciling temporal dependencies while tracking state transitions between the multiple time scales.

17. The method of claim 12, wherein maintaining state information across the different context types comprises tracking relationships and state changes across the different context types while ensuring consistency between the context representations.

18. The method of claim 12 further comprising maintaining consistent state information and tracking state transitions across the multiple time scales during temporal processing.

19. The method of claim 12 further comprising identifying and tracking pattern evolution across the multiple time scales while integrating resulting pattern information into the context representations.

20. The method of claim 12, wherein integrating the unified temporal output with the context representations comprises performing sequential fusion operations for temporal information, context types, and cross-integration of temporal and context information.

21. The method of claim 12 further comprising adjusting processing parameters and updating the context representations based on identified pattern changes across the multiple time scales.

22. The method of claim 12, wherein generating the coherent output comprises validating temporal, context, and state consistency throughout the integration process.

* * * * *